US012440400B2

(12) United States Patent
Shenhod Malihi et al.

(10) Patent No.: US 12,440,400 B2
(45) Date of Patent: Oct. 14, 2025

(54) DYNAMIC REACTIVE SYSTEM AND METHOD TO SUPPORT AND CHANGE SITTING POSTURES

(71) Applicant: RESYMMETRY LTD, Modiin Macabim Reut (IL)

(72) Inventors: Efrat Shenhod Malihi, Modiin Macabim Reut (IL); Daniel Shachaf, Kibbutz Deganiya Bet (IL); Avi Skovlevirz, Kiryat ono (IL); Zeev Shneorson, Ra'anana (IL); Goren Harari, Tel Aviv (IL)

(73) Assignee: Efrat Shenhod Malihi, Modiin Macabim Reut (IL)

( * ) Notice: Subject to any disclaimer, the term of this patent is extended or adjusted under 35 U.S.C. 154(b) by 883 days.

(21) Appl. No.: 17/641,463

(22) PCT Filed: Sep. 9, 2020

(86) PCT No.: PCT/IL2020/050986

§ 371 (c)(1),
(2) Date: Mar. 9, 2022

(87) PCT Pub. No.: WO2021/048847

PCT Pub. Date: Mar. 18, 2021

(65) Prior Publication Data

US 2022/0313510 A1 Oct. 6, 2022

Related U.S. Application Data

(60) Provisional application No. 62/897,418, filed on Sep. 9, 2019.

(51) Int. Cl.
*A61G 5/04* (2013.01)
*A61G 5/12* (2006.01)
(Continued)

(52) U.S. Cl.
CPC ............... *A61G 5/04* (2013.01); *A61G 5/127* (2016.11); *A61G 5/14* (2013.01); *A61H 1/0262* (2013.01);
(Continued)

(58) Field of Classification Search
CPC . A61G 5/04; A61G 5/127; A61G 5/14; A61H 1/0262; A61H 3/04; A61H 3/008; A61H 1/0296
See application file for complete search history.

(56) References Cited

U.S. PATENT DOCUMENTS

| | | | | |
|---|---|---|---|---|
| 5,181,762 A * | 1/1993 | Beumer | ............... | A61G 5/1067 297/358 |
| 5,292,144 A | 3/1994 | Sosnoff | | |

(Continued)

FOREIGN PATENT DOCUMENTS

| | | | |
|---|---|---|---|
| TW | M276569 U | 10/2005 | |
| WO | 2019168414 A1 | 9/2019 | |

*Primary Examiner* — Milton Nelson, Jr.
(74) *Attorney, Agent, or Firm* — SOROKER AGMON NORDMAN RIBA

(57) ABSTRACT

There is provided a dynamic and proactive system for supporting sitting while detecting and changing sitting postures of a user and method of operation thereof. The system including a frame, a plurality of supports, each configured to support a different body part, and a plurality of joints each configured to move independently of or together with any other of the joints, each of the supports is connected to the frame via a corresponding joint, at least one of the joints is a two dimensional joint which enables a change in angle between the frame and a corresponding support. Each one of the plurality of supports is configured to move with respect to the frame or to another support, thereby enabling any changes in sitting postures of the user. The system comprises sensors, which based on their readings, the system detects user postures and suggests or creates posture changes.

20 Claims, 13 Drawing Sheets

(51) Int. Cl.

| | |
|---|---|
| ***A61G 5/14*** | (2006.01) |
| ***A61H 1/02*** | (2006.01) |
| ***A61H 3/00*** | (2006.01) |
| ***A61H 3/04*** | (2006.01) |

(52) U.S. Cl.

CPC ........... *A61H 1/0296* (2013.01); *A61H 3/008* (2013.01); *A61H 3/04* (2013.01)

(56) References Cited

U.S. PATENT DOCUMENTS

| | | | | |
|---|---|---|---|---|
| 5,642,302 | A | 6/1997 | Dumony | |
| 9,499,069 | B2 * | 11/2016 | Hyde | B60N 2/0273 |
| 2012/0080245 | A1 | 4/2012 | Bergman | |
| 2015/0209207 | A1 * | 7/2015 | Cooper | A61G 5/1056 701/49 |
| 2017/0036564 | A1 | 2/2017 | Hyde et al. | |
| 2017/0252238 | A1 | 9/2017 | Mattes et al. | |
| 2018/0147099 | A1 | 5/2018 | Jones et al. | |
| 2020/0121526 | A1 * | 4/2020 | Cooper | A61G 5/1075 |

* cited by examiner

DYNAMIC REACTIVE SYSTEM AND METHOD TO SUPPORT AND CHANGE SITTING POSTURES

TECHNICAL FIELD

The present disclosure generally relates to dynamic mechanical systems to support a sitting posture of a user, and more specifically to dynamic and proactive systems for supporting sitting while enabling changing sitting postures in various manners, and method of operation thereof.

BACKGROUND

Nowadays, in the United States about 20% of the population and about 17% of the population are women and men with disabilities, respectively. Many of the disabled use wheelchairs to assist them in transporting themselves from one place to another, and even around their homes. Various medical conditions may lead a person or child to use a wheelchair, for example, cerebral palsy, head injuries, spinal injuries, degenerative muscle diseases, stroke and other syndromes that cause physical and motion disabilities.

People with disabilities using wheelchairs spend most of the day sitting in their wheelchairs. Sitting for a long period of time without changing positions over time may slowly and systematically cause changes and distortions of the human body, affect function of inner systems of the body, e.g., the gastrointestinal system, and may even cause death. Thus, not only that a person suffers from his physical disability, he may further suffer from secondary implications caused by lengthily sitting in his wheelchair.

For the disabled population, once a wheelchair is properly fitted to each disabled person's body measures, that person may conduct a fairly reasonable lifestyle. However, properly fitting a wheelchair is not enough since the majority of wheelchairs do not provide the ability to change sitting positions or postures. That means the disabled person is not only confined within the wheelchair but that he is also limited to one sitting posture only, which is typically passive. In order to ease the pressure on the pelvis during long sitting, some wheelchairs have been developed that change the angle in which the person is seated, for example, allowing a tilt or recline, however, these new positions or postures do not change the sitting position itself and do not enable movement of the limbs or muscles. Reclining reduces pressure from the pelvis and thighs but it is not a sitting position that allows muscle work of the upper back and head, which means it is not efficient enough per proper muscle exercise. Another wheelchair that is supposed to positively affect the blood flow and accordingly reduce edema includes a mechanism with liftable kickstands. However, this solution does not provide moving the joints and lifting the patient's feet above the heart, which are required in order to actually reduce edema.

Furthermore, nowadays, with the Sedentary Lifestyle many people experience in their work place, which means sitting long hours in front of their computer without moving around much, such people may experience various medical problems, such as skeletal problems as prolapsed disc, and weakening of the muscles.

There is therefore a need for a sitting system, e.g., wheelchair or chair that prevents the side effects of staying in a sitting position for long periods of time for the disabled as well as the non-disabled who work in a sitting environment.

SUMMARY

According to embodiments of the disclosure, there is provided a sophisticated robotic dynamic and proactive system, which may be a part of a wheelchair or chair, and may move its parts such to cause a change in sitting positions, for example, a partially standing position, a saddle sitting position which may include movement of the sitting person's thighs, and so on for moving additional body parts of a user. The dynamic system that supports sitting while enabling changing positions of the sitting user as described in the present disclosure, may change positions of the user as closely as possible to the natural human movement. In addition, the system is proactive since it causes the seated user to be dynamic by moving the user while causing the user to sit differently at various times for certain periods of time, thereby forcing the user to activate different muscle groups and joints during such changes in sitting postures of the system.

According to some embodiments, the dynamic proactive system may further comprise a software to easily operate the various position changes of the user, while considering measurements of different sensors that may be used to monitor forces and pressures applied by the system onto the user, as well as taking into consideration physiological sensors that may be used to determine a certain motion required by the user. The operating software may create repetitive motion patterns that are selected per user, in order to best improve each user's physical capabilities, e.g., improve each user's movement range based on previous measurements of each user's movement range and the required position changes that would be suitable to improve previous measurements.

As explained hereinabove, sitting for long periods of time has a negative effect of various body functions. Thus, using the dynamic proactive system of the present disclosure which changes the sitting positions of a user may lead the user to be more active by using various muscle groups, and by positively affecting physiological functions, such as breathing, digestion, urine, metabolism, etc., in addition to the positive affect on better attentiveness and alertness of the user when the user is completing tasks.

A dynamic and proactive system such as a wheelchair that changes sitting positions of a user, measures and dynamically reacts to the user's state may further reduce expected treatment costs of the disabled population, as less surgeries would be required and less pressure sores would develop during the long sitting hours, since sitting would now become dynamic instead of static.

According to embodiments of the disclosure, there is provided a dynamic system for supporting sitting while changing sitting postures of a user, the system may comprise:

- a frame;
- a plurality of supports, each of the plurality of supports configured to support a different body part of the user; and
- a plurality of joints each configured to move independently of or together with any other of the plurality of joints, whereby each of the plurality of supports is connected to the frame via a corresponding joint of the plurality of joints, wherein at least one of the plurality of joints is a two-dimensional joint such to enable a change in angle between the frame and a support corresponding to the two dimensional joint;
- whereby each one of the plurality of supports is configured to move with respect to the frame or with respect to another support, thereby enabling any changes in sitting postures of the user.

Optionally, the system may be configured to enable two or three-dimensional movement of different body parts of the user.

Optionally, the system further comprises at least one motor connected to the plurality of supports for moving the plurality of supports; and a controller configured to control operation of the at least one motor, thereby controlling movement of each one of the plurality of supports with respect to the frame or with respect to another support, thus enabling any changes in sitting postures of the user.

Optionally, the plurality of supports are selected from a group consisting of: back support, lower back support, upper back support, thigh support, foot rest, knee support, chest support, seat, elbow support, hand support, shoulder support, neck support, or any combination thereof.

Optionally, the at least one motor is an electrical motor or a manually operated motor or a hydraulic motor or a pneumatic motor.

Optionally, the controller is a computer or microcomputer operated controller or a manually operated controller. Optionally, the controller controls changes in sitting postures of the user based on a predefined protocol.

Optionally, the predefined protocol comprises predefined repeating sequences of different changes in postures of the user.

Optionally, the controller controls changes in sitting postures of the user in a one-time manual control manner.

Optionally, the position of each support of the plurality of supports with respect to another support or with respect to the frame is adjusted according to the physical dimensions of the user.

Optionally, the system comprises system sensors for measuring forces and pressures applied on the user by the system or on the system by the user, wherein the system is configured to apply an algorithm for reporting and changing sitting postures of the user based on measurements of the system sensors.

Optionally, the system sensors may be located along the plurality of supports of the system, between the plurality of supports or along the plurality of joints.

Optionally, the system sensors comprise body contact pressure sensors, force sensors or both. Optionally, the system sensors may comprise angle system sensors for measuring the angular position of a sitting user, with respect to seat position, back position, arms and legs position, etc., in either the system's coordinates or the world coordinates, while the angle system sensors may be located on one or more of the supports of the system. Optionally, the system sensors may comprise accelerometer system sensors for measuring the dynamic movement of the sitting user in real time. The accelerometer sensor may measure real time dynamic movement in one, two or three dimensions. The system may further comprise a timer for measuring the time a user is kept at a certain position within the system, and for measuring time between changes of positions.

Optionally, the system comprises physiological sensors for measuring physiological parameters of the user, wherein the system is configured to apply an algorithm for reporting and changing sitting postures of the user based on measurements of the physiological sensors.

Optionally, the physiological sensors are selected from a group consisting of: pulse sensors, body temperature sensors, blood pressure sensors, oximeter sensors, E.M.G. sensors, eye movement sensors, facial expression analyzer and any combination thereof.

Optionally, the controller learns the postures or positions that a user is at, for example, based on data collected by the various sensors of the system, e.g., by measuring pressure applied onto the various supports via corresponding pressure sensors attached onto the supports. For example, a high pressure sensed by a pressure sensor may be translated to a corresponding support which the user is substantially leaning onto, whereas little or no pressure sensed by a pressure sensor may be translated to a corresponding support which the user is less to not leaning onto, thereby the controller and system may determine current postures of the user. The controller may learn common or any postures of the user and may recommend posture changes accordingly such to cause the user to strengthen core muscles and improve length and flexibility of muscles, ligaments and tendons of the user.

Optionally, the system is used for maintaining length and flexibility of muscles, ligaments and tendons of the user and flexibility of joints of the user, thereby presumably avoiding surgery to accomplish same.

Optionally, the system is used for avoiding medical complications of sedentary lifestyle.

Optionally, the system is configured to change sitting postures of the user in a two-dimensional movement or in a two or three-dimensional movement, the two-dimensional movement comprises flexing or extending joints of lower body part of a user and abducting or adducting joints of lower body part of a user, and the two or three-dimensional movement comprises rotating joints of lower body part of a user.

Optionally, the movement of each support of the plurality of supports is independent from movement of any other support.

Optionally, each one of the plurality of supports is able to move while another different support rests or moves at a different angle or position.

Optionally, movement of a first support of the plurality of supports is symmetrical or asymmetrical to movement of a second support of the plurality of supports, the first and second supports being supports of symmetrical body parts.

Optionally, the system is configured to enable rotation of neck, shoulders, elbows and vertebras above the pelvis of the user.

Optionally, the system is a standalone wheelchair.

Optionally, the system is incorporated into a wheelchair by replacing the sitting system of the manually operated or powered wheelchair.

Optionally, the system is incorporated into an office chair, a vehicle seat or any other sitting system.

Optionally, the system comprises an application through which an operator controls the system.

Optionally, the system is configured to change posture of the user to a saddle posture.

Optionally, the system comprises elongated thigh supports configured to support each thigh and pelvis of the user.

Optionally, the system comprises chest supports providing solid support from chest to pelvis of the user to enable upright sitting within the system thereby avoiding movement of the upper body part while enabling movement of the lower body part. The chest supports may be configured to be adjusted per physical parameters of each user with respect to height and width of the chest supports.

According to embodiments of the disclosure, there is provided a method for changing sitting postures of a user, the method comprising:

providing a dynamic proactive system for supporting sitting while changing sitting postures of a user, the system comprising:

a frame;

a plurality of supports, each of the plurality of supports configured to support a different body part of the user;

a plurality of joints each configured to move independently of or together with any other of the plurality of joints, whereby each of the plurality of supports is connected to the frame via a corresponding joint of the plurality of joints, whereby at least one of the plurality of joints is a two or three-dimensional joint such to enable a change in angle between the frame and a support corresponding to the two or three-dimensional joint;

at least one motor connected to said plurality of supports for moving the plurality of supports; and a controller configured to control operation of the at least one motor; and controlling, by means of the controller, movement of each of the plurality of supports with respect to the frame, and movement between one support and another support, thus enabling any changes in sitting postures of the user.

Optionally, the controlling operation may comprise controlling two or three-dimensional movement of different body parts of the user.

In some embodiments, the two-dimensional movement may comprise flexing or extending joints of lower body part of a user and abducting or adducting joints of lower body part of a user, and the two or three-dimensional movement may comprise rotating joints of lower body part of a user.

Optionally, the controller operation may comprise learning and determining the postures or positions that a user is at, for example, based on data collected by the various sensors of the system, e.g., by measuring pressure applied onto the various supports via corresponding pressure sensors attached onto the supports. For example, a high pressure sensed by a pressure sensor may be translated to a corresponding support which the user is substantially leaning onto, whereas little or no pressure sensed by a pressure sensor may be translated to a corresponding support which the user is less to not leaning onto, thereby the controlling operation may comprise determining current postures of the user. The controlling operation may further comprise learning common or any postures of the user and recommending posture changes accordingly, thereby causing the user to strengthen core muscles and improve length and flexibility of muscles, ligaments and tendons of the user.

In some embodiments, the controlling operation may comprise controlling changes in sitting postures of the user based on a predefined protocol.

Optionally, the predefined protocol may comprise predefined repeating sequences of different changes in postures of the user.

In some embodiments, the controlling operation may comprise controlling changes in sitting postures of the user in a one-time manual control manner.

In some embodiments, the controlling operation may comprise controlling position of each support of the plurality of supports with respect to another support or with respect to the frame according to the physical dimensions of the user.

Optionally, the system may comprise system sensors for measuring forces and pressures applied on the user by the system or on the system by the user. In some embodiments, the controlling operation may comprise applying an algorithm for reporting and changing sitting postures of the user based on the forces and pressures measurements by the system sensors.

Optionally, the system may comprise physiological sensors for measuring physiological parameters of the user. In some embodiments, the controlling operation may comprise applying an algorithm for reporting and changing sitting postures of the user based on measurements of the physiological sensors.

Optionally, the movement of each support of the plurality of supports may be independent from movement of any other support.

Optionally, the movement of each of the plurality of supports may occur while another different support rests or moves at a different angle or position.

Optionally, the movement of a first support of the plurality of supports may be symmetrical or asymmetrical to movement of a second support of the plurality of supports, the first and second supports being supports of symmetrical body parts.

Optionally, the method may further comprise logging data related to the user, analyzing and processing the logged data, and providing feedback to the user or the care giver as to required movement per analysis of the logged data.

Optionally, the analyzing operation may comprise comparing the logged data of the user with stored data related to previous position of at least a portion of a body of a user and information related to optimum position of at least a portion of the body of the user, and further comparing current position data with the stored data. Optionally, the analyzing operation may comprise comparing the logged data of the user with stored data of other users, e.g., other users with similar medical background. That is, big data may be collected, stored and used as basis for various decision making by the system and for general research purposes.

Figure 1:
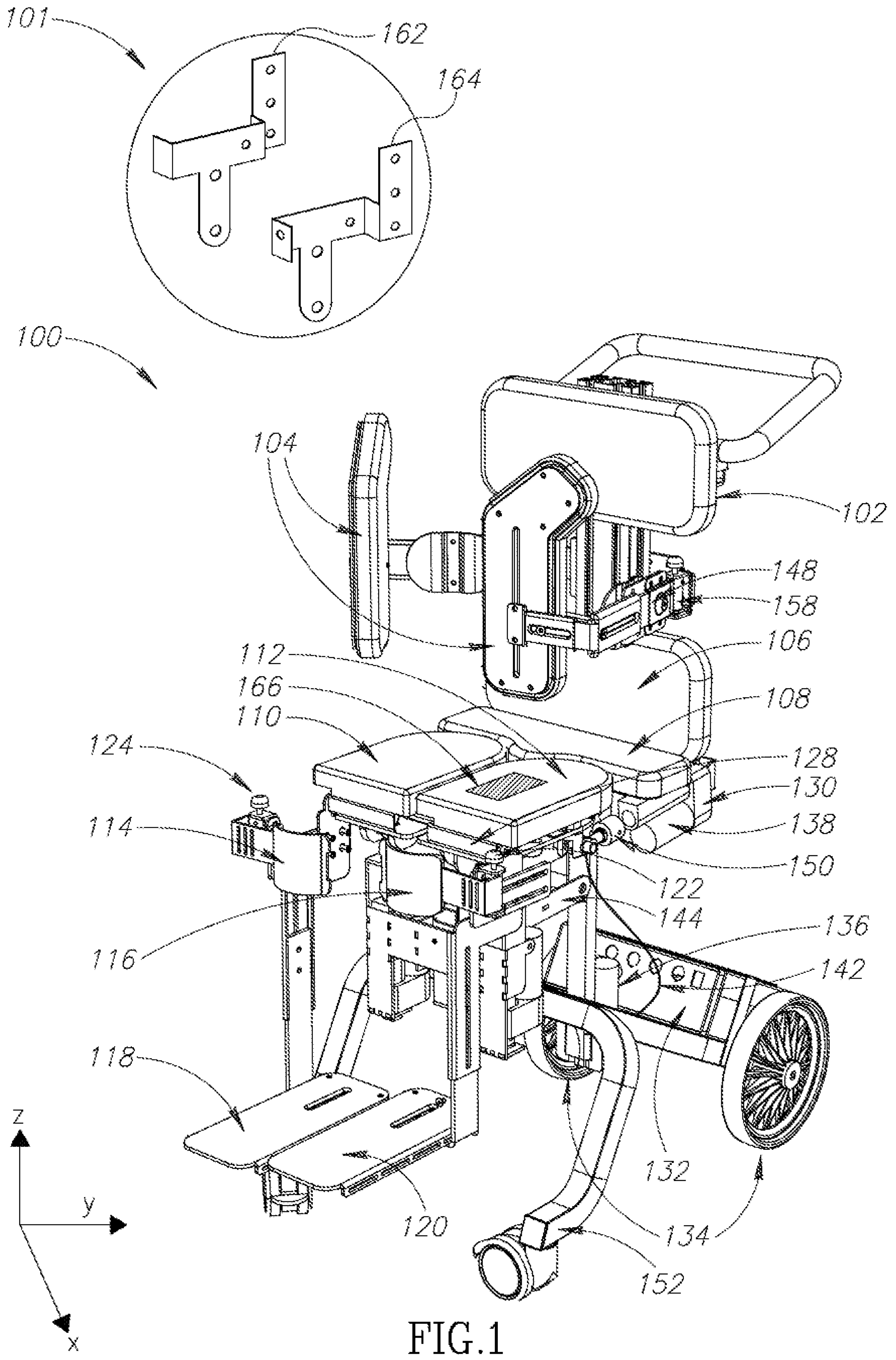
FIG. 1 is a schematic illustration of a perspective view of a system for supporting sitting while changing sitting positions of a user, in rest state, according to embodiments of the present disclosure.

The foregoing will be apparent from the following more particular description of example embodiments of the disclosure, as illustrated in the accompanying drawings in which like reference characters refer to the same parts throughout the different views. The drawings are not necessarily to scale; emphasis instead being placed upon illustrating embodiments of the present disclosure.

DETAILED DESCRIPTION

A robotic dynamic proactive sitting system that enables active sitting instead of passive sitting as will be described throughout the present disclosure, may improve cognitive, physiological, physical and health functions of the user of such system.

The term "proactive system" as used herein refers to a system that creates a change. e.g., a change in a sitting posture, not only as a response or reaction to a certain detected condition but also before detection of any type of condition.

The term "dynamic system" as used herein refers to a system that is able to move and change sitting positions and postures.

The terms "proactive". "dynamic" and "dynamic proactive" may be used interchangeably throughout the entire disclosure.

The terms "sitting position" and "sitting posture" may be used interchangeably throughout the entire disclosure.

This system will also allow its disabled user to leave his house for longer periods of time, as he is less dependent on his caregiver for changing such sitting positions and moving the user's muscles manually, thereby significantly improving the user's life. For healthy users, who live a sedentary lifestyle, the disclosed system and method of operation thereof, which provide changes of sitting positions, may decrease medical complications known to be related with prolonged sitting, for example, musculoskeletal complications, e.g., prolapsed disc, pain (lower back pain, neck pain, etc.) shortening of the muscles, scoliosis and kyphosis, and problems relating to various body systems, e.g., respiratory, digestion, cardio, metabolism, and blood circulation, swollen ankles, pressure sores, etc.

The system and method of the present disclosure, which actually enable changing sitting positions and postures, may affect the high muscles' tone, since moving the muscles decreases the tone and relaxes the body. The system and method of the present disclosure may strengthen the user's muscles, e.g., the user's core muscles, since changing sitting positions causes the user of the system to use different groups of muscles, causing the muscles to strengthen from one use of the system to another. The system and method of the present disclosure assist in maintaining the completeness of the skin of the user or patient and preventing pressure sores by enabling a change in position of the user within the sitting system, thereby allowing good blood flow to any pressurized area of the body. The system and method of the present disclosure decrease pressure under the various body parts and the bones of the user sitting within the system. In addition, the system and method of the present disclosure increase alertness and cognitive awareness as a result of muscles movement and the changing sitting positions and postures.

According to some embodiments of the present disclosure, the system of the present disclosure causes and enables a user to change sitting positions and postures. During sitting within the system, the user may spend time in various sitting positions, and the system may move the user's joints affecting the muscle tension and eventually allowing the muscle to reach its full length. Such user movements and changes may affect the function of internal physiological systems of the user's body, such as the respiratory system, the digestive system, etc. The movement and treatment by the sitting system may be for a prolonged period of the day, per each day, for the disabled population, as well as people living a sedentary lifestyle, for example computer programmers, pilots, dentists, truck drivers and so on.

According to some embodiments, the sitting system may maintain the user's body symmetry by positioning the user in symmetrical positions and asymmetrical positions. The symmetrical positions enable maintaining the completeness of the skeleton and muscle structures and asymmetrical positions enable freedom of movement of the upper limbs, thereby allowing the hands and the head of the user to be more active and increase their function level.

According to some embodiments, the sitting system may be an integral part of currently available wheelchairs, may be attached and adjusted to the chassis of propelling systems of currently available wheelchairs, i.e., powered wheelchairs or light-weight wheelchairs, may be attached onto a moving or resting base within a home or office, e.g., next to a desk, or may be part of an exercise chair which may move and activate the user's body fully or partially during sitting, or may replace the driver seat in vehicles to improve the health of a long hour sitting truck driver, a train driver, a pilot, etc.

According to some embodiments, the dynamic proactive sitting system of the present disclosure may be equivalent to an exoskeleton of the user sitting on the sitting system. The different parts of the sitting system may be moveable and the dynamic proactive sitting system may constantly design itself to change the sitting position of the user, thereby affecting the location of the pelvis. A combination of several motors may work synchronously such that operation of each of the motors is timed with respect to the operation of the other motors such to enable change in positions of the user's body during sitting.

According to some embodiments, the sitting system may comprise a software or application to control position and posture changes based on a predefined protocol. The various positions may comprise half standing, saddle position that affects the location of the thigh joint, and a combination of interval movements, e.g., repeated adduction and abduction of the thighs, or lengthy movements, e.g., vibrations, inside any sitting position.

The human body has numerous points of rotation, for which the system of the present disclosure is configured to maintain capability. According to some embodiments, the system of the present disclosure may enable each joint of the system's user's body to perform a three-dimensional motion or movement, e.g., a rotation movement, following a three or two-dimensional movement of the body supports, which are detailed hereinbelow. These rotation points can be divided into groups:

Upper Body

[01] Head/neck: movement of the head and/or neck aims to enable functionality of the head. This influences stability and balance through the sensory system situated in the inner ear. Head movement and control further affects the eye sight, vision and eye contact. Head and neck position directly influence the patient's respiratory and digestive track, ability to breath and swallow.

[02] Shoulder, elbow, wrist, hand, fingers: moving these body portions pose an important part of the patient's ability to perform daily functions, such as reaching for and handling common objects.

- Shoulder rotation (substantially full joint capability of rotation) affects positioning of the arm.
- Opening and closing the elbow and rotating the lower arm (substantially full joint capability of rotation).
- Full rotation of the wrist (substantially full joint capability of rotation) and raising or lowering the hand.
- Opening and closing the fist and flexing the fingers, together or independently of one another.

[03] Torso

[04] Movement of the torso affects body posture, core strength, sitting muscles, walking muscle strength, and use of upper limbs

- Side flexion: reaching down from the side
- Front flexion: reaching from the front or the back
- Pelvis: anterior/posterior pelvic tilt, pelvic rotation backwards/forwards, posture while sitting or walking
- Rotation: rotation of the upper torso without pelvic rotation or rotation of upper torso with counter-rotation of pelvic

[05] Lower Body: Hip, Knee, Ankle

[06] There are a number of rotations that are critical for rehabilitation:

- Hip: rotation of substantially full joint capability (rotational joint), lifting forward and backward of the leg, moving legs towards and away from torso, i.e., adduction and abduction
- Knees: bending and straightening of the leg
- Ankle: rotation of substantially full joint capability and flexing of the foot
- Foot and toes: flexing and curling toes, together or independently of one another.

The terms "support" and "rest" may be used interchangeably through the description. These terms as used herein refer to a surface that provides support for a body part that is configured to rest on them.

The terms "sitting positions" and "sitting postures" may be used interchangeably through the description. These terms as used herein refer to orientation of the user's body and/or the orientation of moving elements of the proactive dynamic supporting sitting system of the present disclosure.

According to the present disclosure, sitting postures or positions may include, but are not limited to:

- sitting with the pelvis of the user being at the same level as the knees of the user, legs adducted;
- sitting with the pelvis of the user being at the same level as the knees of the user, legs abducted up to approximately 30 degrees on each side;
- sitting with the pelvis of the user being at the same level as the knees of the user, legs adducted at different angles with respect to one another, e.g., asymmetrical abduction;
- sitting with the pelvis of the user being at the same level as the knees of the user, both legs adducted and rotated together to same direction to create lower back rotation;
- sitting with the pelvis at a level higher than that of the knees with symmetrical or asymmetrical abduction or adduction;
- sitting at a saddle posture, i.e., back is upright, thighs are abducted and each thigh is rotated away from the core of the body and downwards by rotating the thigh joint in two or three-dimensional movement;
- back is located parallel to the ground, with or without lifting the tibias in parallel to the ground, until a full lying down posture;
- tilting back backwards or forwards while maintaining an angle ranging between 45 to 90 degrees between the back of the user and the ground;
- sitting
- any sitting position in between the recited positions, or any other position between lying downs and sitting upright with adducted legs, including or excluding rotation of the hands and feet joints, each joint separately, or some joints at once.

Reference is now made to FIG. 1, which schematically illustrates a perspective view of a system for supporting sitting while changing sitting positions of a user, in rest state, according to embodiments of the present disclosure. System 100 for supporting sitting of a user while enabling to change positions of the user during the user's sitting period, may comprise a frame 101, which may comprise a right-side frame 162 and a left side frame 164 (further illustrated in FIG. 4B). Frame 101 may provide the chassis of system 100, such that elements of system 100 may be connected onto frame 101. In some embodiments, frame 101 along with the additional elements of system 100, may create system 100 that is configured for seating a user. In some embodiments, frame 101 may be made of a rigid and strong material, e.g., metal, stainless steel, or any other material that has similar properties.

In some embodiments, system 100 may enable rotational movement of each of the supports connected to system 100, as will be detailed hereinbelow. In some embodiments, the movement enabled by system 100 may comprise rotation about a joint in substantially full joint capability of rotation, such to enable substantially any change in position of the user sitting within system 100.

In some embodiments, system 100 may comprise a seat 108, which may be a support that supports the pelvis of a user that is to be seated in system 100. In some embodiments, seat 108 may be connected to frame 101 via a two or three-dimensional joint (not shown), which may enable movement of seat 108 in substantially full joint rotation capability around the two or three dimensional joint with respect to frame 101, which enables two or three-dimensional movement of the pelvic of a user placed on seat 108 of system 100. The two or three-dimensional joint connecting seat 108 to frame 101, may be a ball joint, a spherical rolling joint, a swivel joint, a cross joint or any other joint that may enable movement of body parts in all three axes, thereby enabling rotation movement of body parts, e.g. the pelvis. In some embodiments, seat 108 may be connected to frame 101 via more than one two or three-dimensional rotating joints, which may be manipulated and controlled simultaneously, i.e., may be operated during the same time and in the same direction. When the pelvis of the user is able to rotate towards the left or right sides of the user, it may in fact create rotation of the back of the user.

In some embodiments, system 100, specifically seat 108 may comprise an elevating parallelogram 144, which may be configured to elevate seat 108, according to requirements of a predetermined motion protocol, e.g., for changing sitting position to a saddle position, as will be detailed hereinbelow, or with respect to desires of the user or his caregiver.

In some embodiments, system 100 may comprise a back rest 106, which may be connected to frame 101 via a two or three-dimensional joint (not shown) such to enable rotational movement of back rest 106 and thereby enable two or three-dimensional movement of the back of a user placed on back rest 106 of system 100, in substantially full joint capability of the back rest joint with respect to frame 101. Back rest 106 may be configured to support the lower back of a user sitting in system 100. In some embodiments, system 100 may further comprise an upper back rest 102 configured to support the upper back of a user to be seated in system 100. Upper back rest 102 may also be connected to frame 101 via a two or three-dimensional joint (not shown) such to enable movement in substantially full joint capability of rotation of upper back rest 102 about the upper back rest joint with respect to frame 101.

According to some embodiments, system 100 may comprise chest supports 104, which may typically comprise two chest support, one located at the right side of the user's chest and one located at the left side of the user's chest. Each of the chest supports 104 may be attached to frame 101 via a corresponding lateral unit 148. Lateral units 148 may be used to anchor and adjust the position of chest rests 104 with respect to the user, based on the physiological parameters of the user. For example, a low weighing thin user requires chest rests 104 to be located at a smaller distance from upper back rest 102, as compared to the larger distance required between chest rests 104 and upper back rest 102, in case a heavy weight fat user is to be seated in system 100. Accordingly, lateral units 148 may be adjusted to implement the appropriate distance between chest rests 104 and upper back rest 102 in order to keep the user seated while preventing the user from slipping forward along seat 108. Chest rests 104 may provide support along the entire back of the user and assist the user to maintain his sitting position without moving forward. Chest rests 104 may maintain the user's neck and shoulders area free from any additional support, though in some embodiments, a head or neck support and possibly shoulders supports may be added to system 100, in case a user requires such additional supports in order to be kept in seated position.

In some embodiments, chest supports 104 may provide solid support from chest to pelvis of the user to enable upright sitting within system 100 thereby avoiding movement of the upper body part while enabling movement of the lower body part. In some embodiments, chest supports 104 may be configured to be adjusted per physical parameters of each user being seated in system 100, with respect to height and width of chest supports 104, which may be controlled via adjustment of later units 148, and joints 158.

In some embodiments, chest supports 104 may be separable from frame 101, i.e., may be standalone supports that may be connected to other systems or chairs, such as a stander, bed or any type of wheelchair. When control of movement is required only at the lower body part of a user, chest supports 104 may be used to prevent movement of the upper body part, such that controlled movement is enabled only at the lower body part of the user.

In some embodiments, each of the chest supports 104 may be connected to frame 101 via a joint 158, which may be a two dimensional joint for opening and closing chest rests 104 with respect to frame 101, such that closing chest rests 104 enables a user to be supported by chest rests 104, whereas opening chest rests 104 allows a user to exit system 100.

In some embodiments, system 100 may comprise thigh supports, for example, a right thigh support 110 and a left thigh support 112. In some embodiments, right side support 110 may be configured to support the right thigh of the user of system 100, while left thigh support 112 may be configured to support the left thigh of the user. Each of the thigh supports 110 and 112 may be connected to frame 101 via a two or three-dimensional thigh joint (e.g., 3D thigh joints 126, FIG. 3) in order to provide a substantially full joint capability of motion of each support with respect to frame 101, and thereby enable two or three-dimensional movement of each thigh that is placed on its respective thigh support. The movement that is to be enabled by the two or three-dimensional joints includes adduction, abduction, rotation, lifting, lowering and so on, of each thigh support 110 and 112 with respect to frame 101 and with respect to one another. Each of thigh supports 110 and 112 may be manipulated and controlled either simultaneously with the other or independently from one another, such that, for example, right thigh support 110 may be moved while left thigh support 112 may be in rest state. i.e., not be moved at all, and vice versa. In addition, right side thigh support 110 may be moved in one direction, while left thigh support 112 may be moved in a different direction, independently of the direction at which right thigh support 110 is moved. In addition, right side thigh support 110 may be rotated at a certain angle, while left thigh support 112 may be rotated at a different angle. That is, the thigh supports 110 and 112 may move asymmetrically or symmetrically.

In some embodiments, instead of system 100 including a seat 108, each of thigh rests 110 and 112 may be longer such to reach and support the pelvis of the user, and not only support each of the thighs of the user. Elongated thigh supports that may support the two sides of the pelvis of a user, e.g., elongated right thigh support 110 may support the right side of the pelvis as well as the right thigh, and elongated left thigh support 112 may support the left side of the pelvis in addition to the left thigh, may improve the swivel angels that may be reached by the hip joints of the user.

In some embodiments, system 100 may comprise foot rests, for example, right foot rest 118 and left foot rest 120. Right foot rest 118 may be configured to support the right foot of a user to be seated in system 100, while left foot rest 120 may be configured to support the left foot of the user. Each of the foot rests 118 and 120 may be connected to frame 101 via a two or three-dimensional joint (not shown) such to enable two or three-dimensional movement of each of the foot rests 118 and 120 with respect to frame 101 and with respect to one another, thereby to enable two or three-dimensional movement of each of the feet of a user that are to be placed onto respective foot rests 118 and 120.

Each of the foot rests 118 and 120 may be connected to frame 101 via a two or three-dimensional foot joint in order to provide a substantially full joint capability of rotation of each foot rest with respect to frame 101. The movement that is to be enabled by the two or three-dimensional joints includes adduction, abduction, rotation, lifting, lowering and so on, of each foot rest 118 and 120 with respect to frame 101 and with respect to one another. Each of foot rests 118 and 120 may be manipulated and controlled either simultaneously with the other or independently from one another, such that, for example, right foot rest 118 may be moved while left foot rest 120 may be in rest state, i.e., not be moved at all, and vice versa. In addition, right foot rest 118 may be moved in one direction, while left foot rest 120 may be moved in a different direction, independently of the direction at which right foot rest 118 is moved.

According to some embodiments, system 100 may comprise knee supports, for example right knee support 114 and left knee support 116. Right knee support 114 may be configured to support the right knee of the user using system 100, while left knee support 116 may be configured to support the left knee of the user. In some embodiments, knee supports 114 and 116 may comprise knee joint 124 and 122, respectively, which may connect between knee supports 114 and 116 to frame 101. Each of knee joints 122 and 124 may be configured to anchor the user's knees to system 100, as well as adjust the position of each knee support 114 and 116 with respect to frame 101 and with respect to one another. Knee joints 122 and 124 may be configured to enable two-dimensional movement of each of knee supports 114 and 116. Movement of each knee support may be independent of movement of the other knee support, though movement of each knee support may be simultaneous with movement of the other knee support or to the same direction. Movement of the knee supports may be symmetrical or asymmetrical. That is, right knee support 114 may move in the same direction and angle and at the same time as left knee support, or at the same time as left knee support while moving at an opposite direction to that the left knee support is moved at. In other embodiments, one knee support may be in rest state. i.e., may not be moved, while the other knee support is moved at any direction. This flexibility in motion between one knee support to another, with respect to frame 101 may enable moving the user's knees to substantially any position, thus causing the user to work on different sets of muscles with each position change. In yet other embodiments, knee supports 114 and 116 may only provide support to the knees of the user by maintaining position of each of the knees in place and preventing the knees from dislocating. i.e., no movement is enabled by knee supports 114 and 116.

According to some embodiments, system 100 may enable each joint of the system's user's body to perform a three-dimensional motion or movement, e.g., a rotation movement substantially equivalent to full joint capability of rotation, via a two or three-dimensional movement of a corresponding body support that supports the specific user's joint, thereby enabling a two or three-dimensional movement of a body part that is supported by a respective moveable support.

In some embodiments, system 100 may comprise at least one motor that may be configured to move each of the supports and rests of system 100, about their respective joints. In some embodiments, system 100 may comprise a motor 136 that may be located at the back of system 100, which when operated may move the supports of system 100. In some embodiments, system 100 may comprise more than one motor to operate movements of elements of system 100.

According to some embodiments, system 100 may comprise an opening side motor 138, which may be configured to operate movement of thigh supports 110 and 112. That is, in some embodiments, motor 138 may operate movement of the corresponding joint connecting thigh supports 110 and 112 to frame 101, thereby operating movement of thigh supports 110 and 112, whether symmetrically of asymmetrically.

In some embodiments, in case system 100 comprises more than one motor, operation of the motors may be synchronous such that operation of each of the motors is timed with respect to the operation of the other motors in order to enable change in postures of the user's body during sitting, at a continuous manner, with all required motors working together to accomplish smooth motions during sitting posture change. In some embodiments, each of the plurality of motors may be operated independently of the other motors of system 100.

According to some embodiments, system 100 may comprise a central control computer 132, which may be configured to control operation of the at least one motor 136, and thus may control changing sitting positions of system 100 to enable substantially any change in position of a user within system 100. Central control computer 132 may be any processing means configured to execute at least one instruction given by a computer readable program. In some embodiments, the computer readable program may conduct at least one of the following actions: logging data related to the user, such as positions of at least some of the user's body parts, analyzing and processing the user's data, and providing feedback to the user or the care giver.

Processing and analyzing the user's data may comprise:

i. comparison of the user's data with stored data and information related to optimum position of at least a portion of the user's body,
ii. comparison of the position data with stored data related to at least one previous position of at least a portion of the user's body.

In some embodiments, providing feedback to the user or the care giver may be based on the position data of the user, the analysis thereof, or the comparison thereof.

In some embodiments, central control computer 132 may be operable through a computer program, which may be operated via voice command, touchscreen, keyboard, joystick and the like.

According to some embodiments, system 100 may comprise system sensors configured for sensing forces, pressures, angular position, dynamic movement, etc., which may be applied on the user by system 100. For example, system 100 may comprise pressure sensors and force sensors, e.g., motor power sensor 150, which may be located along the various supports and rests of system 100, along the at least one motor of system 100, or between the at least one motor and the moving parts of system 100, e.g., each of the plurality of supports. The system sensors of the present disclosure may further comprise angle system sensors for measuring the angular position of a sitting user, with respect to seat position, back position, arms and legs position, etc., in either the system's coordinates or the world coordinates, while the angle system sensors may be located on one or more of the supports of the system.

According to some embodiments, the system sensors may comprise accelerometer system sensors for measuring the dynamic movement of the sitting user in real time. The accelerometer sensor may measure real time dynamic movement in one, two or three dimensions. The system may further comprise a timer for measuring the time a user is kept at a certain position within the system, and for measuring time between changes of positions.

The different system sensors of system 100 may be attached to one or more surfaces of the supports and rests of system 100, e.g., sensor 166, which may be a pressure sensor, is located on left thigh support 112 (though any other location is possible), in order to be in contact with the user as well as components of system 100, thereby to properly measure pressures and forces applied on the user by system 100, and measure pressures and forces applied on the system 100 by the user.

In some embodiments, system 100 may comprise physiological sensors, which may be connected onto the body of the user for measuring physiological parameters of the user. The physiological sensors may be one or more of: pulse sensors, blood pressure sensors, oximeter sensors, E.M.G. sensors, temperature sensors, eye movement sensors, facial expression analyzer, and any combination thereof. Additional physiological sensors may be used. Pulse sensors may be located on the wrist or finger of the user, oximeter sensors may be positioned on the finger of a user, E.M.G. sensors may be located onto various muscles, and so on. Another example of a sensor to be used may be an imaging device such as a camera that may be attached onto system 100, while the user may have attached location markers for indicating a location of a body part along the skeleton of the user (the markers being located, for example, along the skin of the user, thereby not being invasive). The camera may collect images of the markers, and the processor of system 100 may determine the need for any possible posture changes accordingly.

According to other embodiments, in order to determine location and posture of a body part with respect to the user's skeleton, system 100 may comprise a designated AI (Artificial intelligence) software or an interferometric camera (e.g., two cameras located at a known distance from system 100 which may calculate depth) that may be based, for example, on GOM (Geometric Optic Measurements) technology.

The information and measurements collected by such system sensors and physiological sensors per user may be collected by central control computer 132 and may be used for determining proper range, speed, and duration of position changing and muscle exercise applied by system 100 on the specific user. The measurements collected by the system sensors and physiological sensors may be used for fine-tuning the operation of proactive dynamic system 100, for example, the position of the supports and rests of system 100 may be changed according to the measurements of the system sensors and/or the physiological sensors, for example, such to incur less stress on the user. For example, if the pressure sensing indicates an uneven sitting position with undesired leaning towards one side, system 100 may automatically correct the position by adjusting the relevant supports of rests of system 100 by receiving a command from central control computer 132. Control computer 132 may execute an algorithm that uses readings and measurements supplied by system sensors and/or physiological sensors of system 100, and based on these measurements control computer 132 may report to the user and/or caregiver of a sitting posture change control computer 132 is about to perform, and central control computer 132 may then adjust the sitting postures of the user, in order to be less stressful or less intensive for the user. For example, in case a high pressure is measured on one support and the user's oxygen levels are low, and pulse is high, it is clear that the user is sitting in a posture that is not convenient for the user. Accordingly, central control computer 132 may automatically change the sitting posture such to lower measured pressure by that support, and then determine whether oxygen levels have increased, and pulse has decrease, which would indicate the user is no longer experiencing stress.

In some embodiments, the controller or central control computer 132 may learns the postures or positions that a user is at, for example, based on data collected by the various sensors of the system, e.g., by measuring pressure applied onto the various supports via corresponding pressure sensors attached onto the supports. For example, a high pressure sensed by a pressure sensor may be translated to a corresponding support which the user is substantially leaning onto, whereas little or no pressure sensed by a pressure sensor may be translated to a corresponding support which the user is less to not leaning onto, thereby the controller and system may determine current postures of the user. The controller may learn common or any postures of the user and may recommend posture changes accordingly such to cause the user to strengthen core muscles and improve length and flexibility of muscles, ligaments and tendons of the user.

In some embodiments of the present disclosure the user may provide central control computer 132 with instructions for adjusting the supports by exerting pressure on at least a portion of system 100, or by performing a movement. In a non-limiting example, system 100 may be programmed to sense a specific leg movement or pressure applied on a leg and respond with a predetermined sequence or protocol of support or rests modifications. In another non-limiting example, system 100 may be configured to predict a desired movement of the user, e.g., in case a user attempts to reach and grab an object located above him, the user's movements along with the specific sensed pressure points, sensed by the pressure sensors, may indicate this to central control computer 132 and central control computer 132 may instruct the relevant supports and/or rests, e.g., the chest supports, the back support, the seat, etc., to adjust and change position such to aid the user in reaching the required object.

In some embodiments, dynamic proactive system 100 may provide support or aid to enable the user to walk or simulate walking by system 100. In some embodiments system 100 may comprise wheels 134, which may enable system 100 to move, thereby moving and transporting the user of system 100. In some embodiments, system 100 may actively effectuate the user's walking movements or may passively assist the user's walking movements. The movements of system 100 may be directed by the user himself or by the therapist/caregiver. In some embodiments, the user's walking movements may be directed in an automatic or semi-automatic manner by central control computer 132.

In some embodiments, system 100 may be provided with at least one predetermined motion sequence or predetermined protocol comprising at least one movement of at least one support or rest for a specific physiotherapy session. At least one motion sequence or protocol may also be provided by a caregiver. Sequences, such as for different kinds of sessions or being directed to different users, may be stored in at least one database. Sequences may be created by a caregiver or by the user by processing instructions entered by various technologies, such as voice commands or keyed-in text. In some embodiments, central control computer 132 may be configured to record movements performed manually by the caregiver, such as moving the user's limbs, and central control computer 132 may convert these movements to a sequence. Accordingly, such a sequence may be followed by central control computer 132 to operate system 100 according to the sequence, thus enabling operation of system 100 even when the caregiver is not present.

Movement and pressure points, and other sensed data, may also be tracked and stored, and this data may be analyzed to provide the user and the caregiver with a progress report, indicating advancements and setbacks the user has gone through. The sensor data may also be provided to the caregiver in real time, enabling manual adjustment of the supports and rests in accordance with the current state of the user, or in accordance with the user's desires, as communicated through the physiological and system sensors.

System 100 may be designed to be installed over a base 152, such that system 100 may be connected to a base 152 of a wheelchair, whereby base 152 may comprise wheels 134, which may be operated by a motor. In such case, system 100 may be used by a user having a disability, such as cerebral palsy, though a user with other disabilities may also use such system 100. In some embodiments, system 100 is in fact a wheelchair, whereas in other embodiments, system 100 may be used to replace a sitting system of a current wheelchair, such that the new wheelchair would include the sitting system of system 100. In yet other embodiments, base 152 may be a base of an office chair, such to be used by a user that has no disabilities but rather might be sitting for long periods of the day thus suffering from sedentary life-style. In some embodiments, system 100 may be connected to a base of a vehicle seat, for example, a truck driver seat, which may allow the truck driver to have more flexibility in sitting postures, and thus ease his muscles, since he is spending most of his day sitting in his truck. Any other vehicle may implement such a sitting system 100. In some embodiments, system 100 may be connected or attached to any other base with or without propelling means, such as wheels, or to any sitting system.

In some embodiments, by rotating one or more of the supports or rests of system 100, body sections of the user of system 100 may be moved over a large range of motions, ranging from simple motions such as straightening a joint to more complex motions such as bending over or standing up. Movements may be tailored according to the patient's physical status, such as the user's joints and muscles flexibility and stiffness state. The movements may be tailored by controlling the speed, power or range of motion of the movement of each of the plurality of supports of system 100.

In some embodiments, system 100 may be used for maintaining length and flexibility of muscles, ligaments and tendons of the user and flexibility of joints of the user, thereby avoiding surgery to accomplish same. In some embodiments, system 100 may be suitable for use by users who underwent different medical complications, or who are suffering from various medical conditions, for example, cerebral palsy, stroke, elderly, recovery following injury or surgery, rheumatism, general joint problems, multiple sclerosis, and so on.

Figure 2:
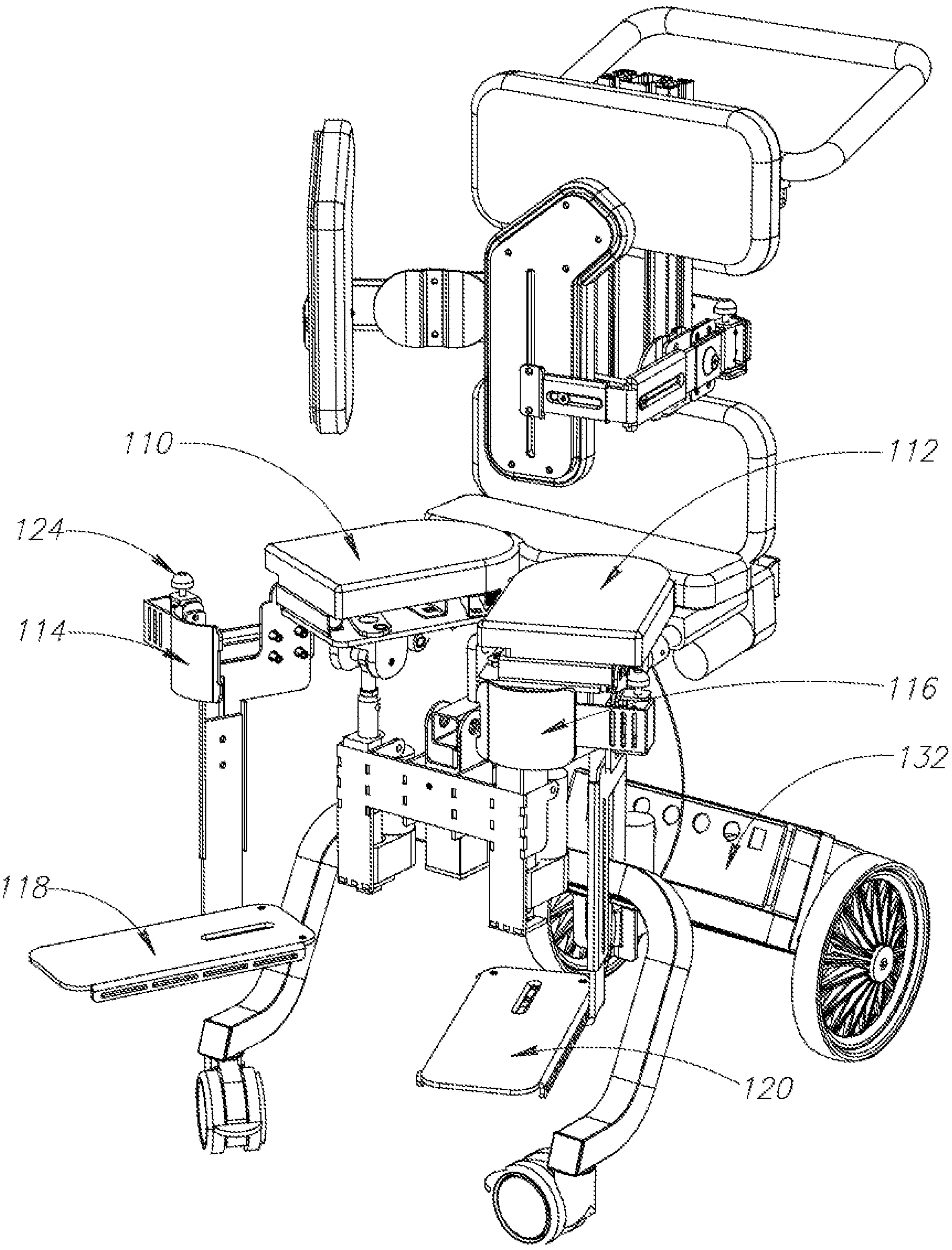
FIG. 2 is a schematic illustration of a perspective view of a system for supporting sitting while changing sitting positions of a user, in thighs abduction state, according to embodiments of the present disclosure.

Reference is now made to FIG. 2, which is a schematic illustration of a perspective view of a system for supporting sitting while changing sitting positions of a user, in thighs abduction state, according to embodiments of the present disclosure. As can be seen in FIG. 2, system 100 may illustrate a change in position of a portion of a body of a user, in this example, system 100 may be in a state where the back of the user is upright and the thighs of the user are abducted, i.e., moved away from one another. That is, right thigh support 110 may be moved towards the right side of the user's body, e.g., turned away from the core of frame 101 at a certain angle, while left thigh support 112 may be moved towards the left side of the user's body, e.g., turned away from the middle or core of frame 101 at substantially the same or at a different angle from that of right thigh support 110, while distancing itself from the main middle part of frame 101. When right thigh support 110 and left thigh support 112 are moving away from one another, an abduction state is reached.

According to some embodiments, an upright sitting posture with abduction between the thighs of the user is one example of a sitting posture made possible by system 100. In some embodiments, system 100 may provide the ability to perform repeated movements of various body parts during a session or protocol according which system 100 may operate. For example, a possible predefined protocol may comprise changing user's posture from sitting upright with his thighs in adduction to sitting upright with thighs in abduction, then changing posture to sitting upright with thighs in adduction, and so forth, for a predetermined period of time, or for a predetermined number of repetitions. It should be clear that such a protocol is merely an example for endless possible protocols which may be predefined based on, for example, current state of muscle flexibility and length and joint flexibility, per user. Additional muscles and joints may be activated, i.e., moved based on a predetermined protocol. As mentioned hereinabove, system 100 may change a predefined protocol, or may change a one-time posture based on readings from system sensors and/or physiological sensors that are used to indicate the user's stress level and the user's ability to continue posture changing according to the predefined protocol.

According to some embodiments, system 100 may be configured to enable repeated motion of abduction of the thighs and adduction of the thighs. The specific motion protocol according to which the user may change his thigh positions may be predetermined according to specific user parameters, such as physiological measurements and stored data re the user's thigh flexibility and muscle tension measured during previous position changing session. System 100 may measure the user's physiological parameters and pressure and force applied by system 100 onto the user, per each session, as it takes place, in order to use the measured data for future sessions.

In some embodiments, system sensors, e.g., pressure sensors that may be implemented within elements of system 100, e.g., the various supports, may measure pressure and resistance applied onto the sensors, and system 100 may react to such measurements by changing position of system 100. For example, increasing muscle tension at the area of the head and thighs, which causes high muscle tone and may be part of a protocol to straighten the body, may cause system 100 to change position such to lower muscle tension.

In some embodiments, an algorithm may learn the sitting behavior of a person, and motion changes applied by a caregiver and accordingly operate a motion protocol such to change positions based on the functioning and needs of that person. In some embodiments, system 100 may comprise a memory and database in which all measurements and data collected from system 100 and the user using system 100 may be collected and stored. Based on all of the collected data, a specific tailored protocol may be suggested to such user.

Figure 3:
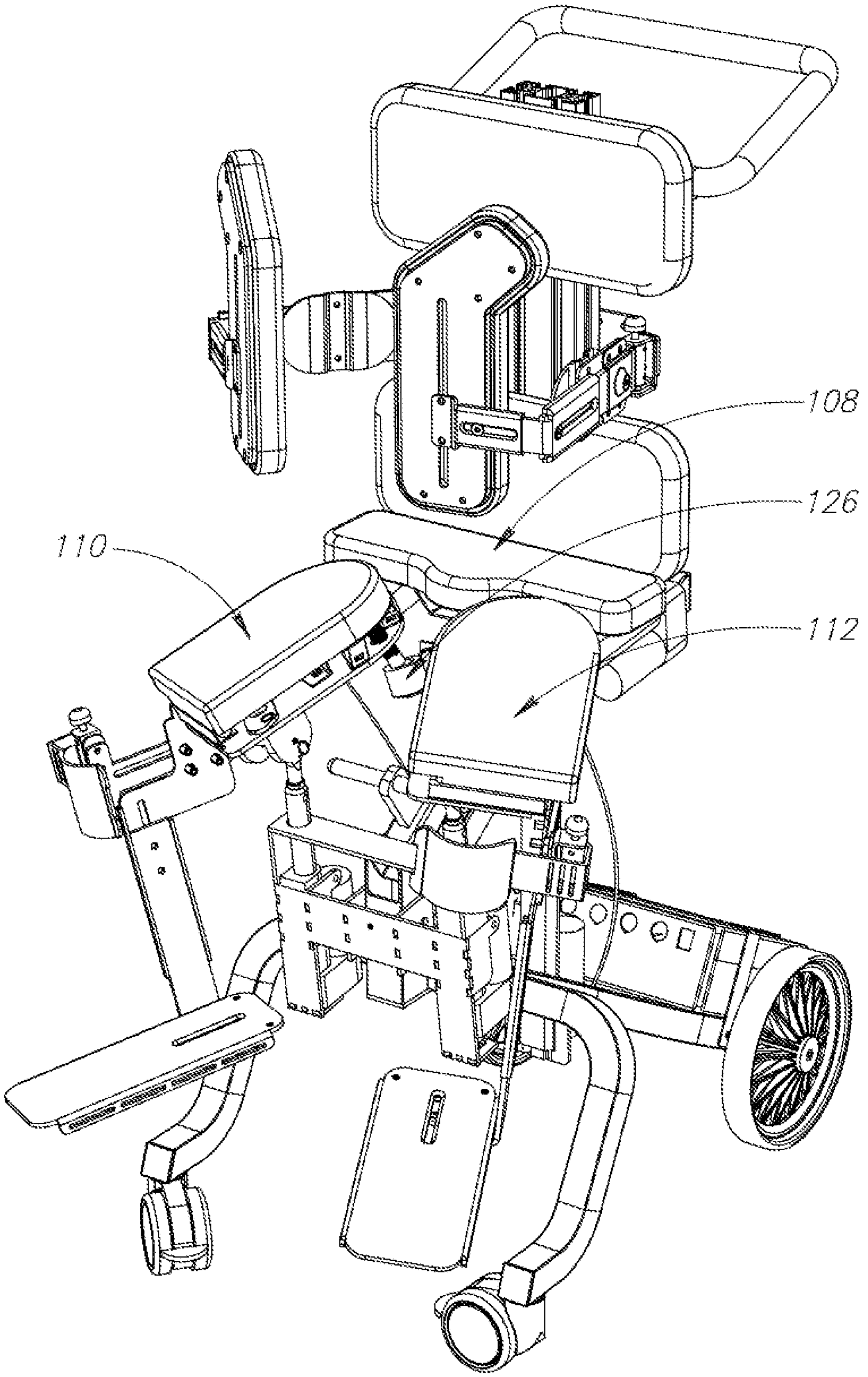
FIG. 3 is a schematic illustration of a perspective view of a system for supporting sitting while changing sitting positions of a user, in thighs abduction and lifted seat state, according to embodiments of the present disclosure.

Reference is now made to FIG. 3, which is a schematic illustration of a perspective view of a system for supporting sitting while changing sitting positions of a user, in thighs abduction and lifted seat state, according to embodiments of the present disclosure. FIG. 3 illustrates system 100 in upright sitting with thigh abduction as illustrated in FIG. 2 with the addition of lifted seat position. In some embodiments, seat 108 may be lifted via operation of elevating parallelogram 144 (FIG. 1). The amount in which seat 108 is to be lifted may be dictated by a predetermined protocol, by the user's manual operation of system 100 or by manual operation of a caregiver.

In some embodiments, right thigh support 110 may be distanced from the middle of frame 101, as is left thigh support 112 distanced from the middle portion of frame 101, in order to create the abduction posture. Each of the thigh supports 110 and 112 is connected to frame 101 via a joint, which may be a two or three-dimensional joint 126. The two or three-dimensional joint 126 is what enables movement and opening angle of each of thigh supports 110 and 112. When seat 108 is lifted compared to its former position, the posture illustrated by FIG. 3 is provided.

Figure 4A:
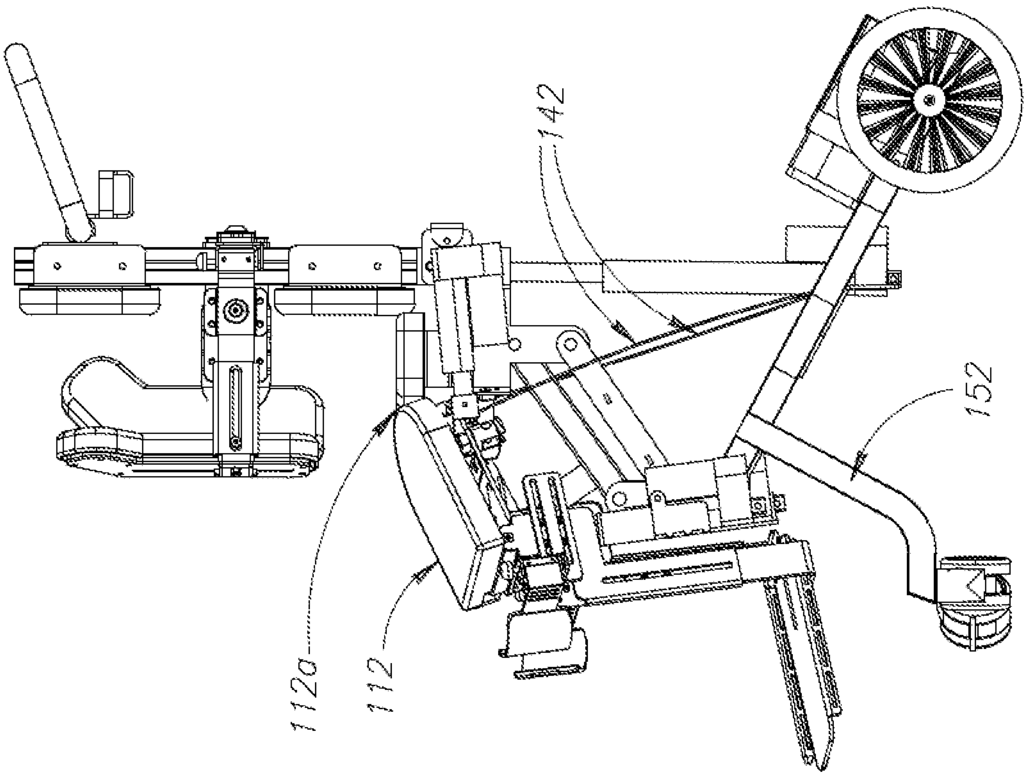
FIGS. 4A-4B are schematic illustrations of a side view and a back-side perspective view, respectively, of a system for supporting sitting while changing sitting positions of a user, in saddle state, according to embodiments of the present disclosure.
Figure 4B:
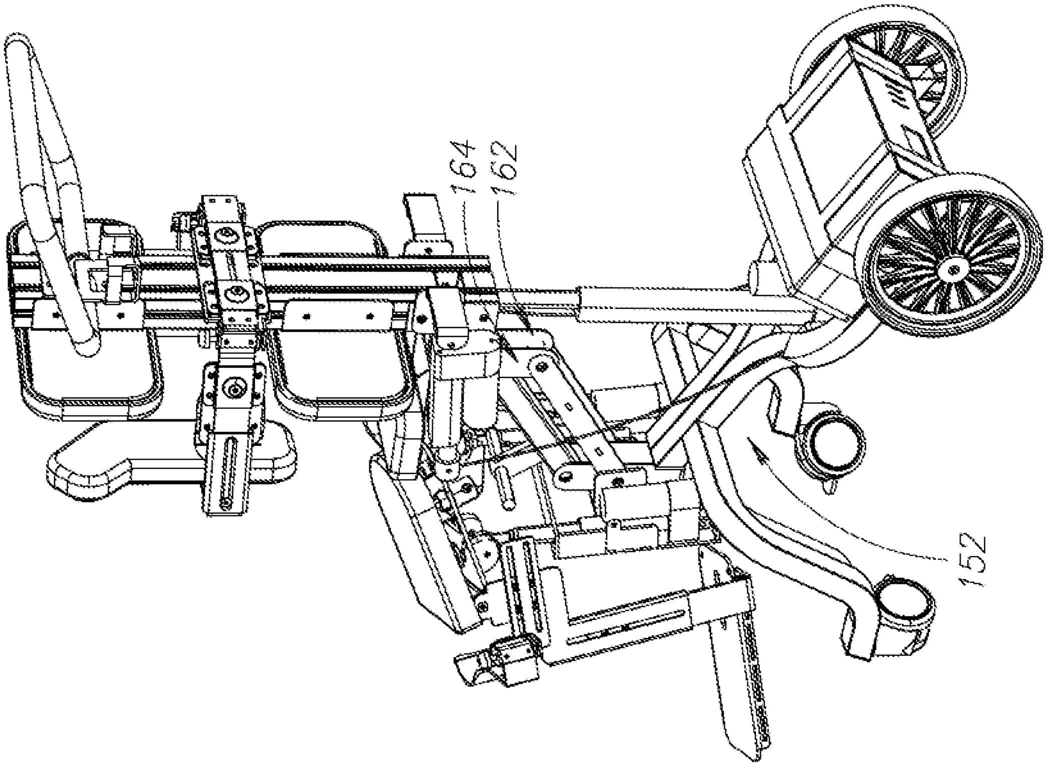

Reference is now made to FIGS. 4A-4B, which are schematic illustrations of a side view and a back-side perspective view, respectively, of a system for supporting sitting while changing sitting positions of a user, in saddle state, according to embodiments of the present disclosure. FIGS. 4A-4B illustrate an example of another position that may be performed by system 100. When a user is sitting in a saddle position of system 100, the user's right and left thighs are supported by respective thigh supports 110 and 112, the thighs being located at an opening angle with respect to the middle of frame 101 and the thighs are also at an angle with respect to the ground. In the saddle posture, seat 108 is lifted such that the user is partially sitting on seat 108 and partially applying pressure on the user's feet, pressed against foot rests 118 and 120, while rotating the user's thighs outwards from the middle portion of frame 101. Thus, a saddle position is somewhat in between a standing and a sitting position. This is another posture that may cause the user to exercise his muscles, but mainly to prevent dislocation of the hip joint of the user, since the saddle posture causes the hip joint to be rotated in three-dimensional movement within the pelvis and to influence a bigger muscle group. The saddle posture is important mainly for use by users with disabilities, who tend to dislocate their hip joint, due to a restricted sitting posture provided by current wheelchairs. The saddle posture may further improve blood flow to the muscles of the user sitting in such posture, which is of course another advantage for any user of system 100.

Furthermore, the saddle position enables to change the pelvis posture during sitting position from back rotation of the pelvis with respect to the spinal cord to a front rotation of the pelvis, thereby mechanically causing the back muscles of the torso to straighten, which leads to active sitting. The saddle posture thus strengthens muscles and improves alertness and attentiveness of the user sitting in such saddle posture.

In some embodiments, system 100 may comprise an elevating parallelogram 144 (FIG. 1) for lifting and lowering seat 108. In addition, system 100 may comprise means for preventing each of the thigh supports 110 and 112 to elevate above the ground along with the lifting of seat 108, by being connected on one end to the external side of the back end of each of thigh supports 110 and 112, and on the other end being connected to frame 101 or to a base to which system 100 is connected to. For example, a rigid cable may be connected between the external side of the back end 112*a* of thigh support 112 and base 152. Similarly, an additional rigid cable 142 may be connected between the external side of the back end of thigh support 110 and base 152. Rigid cables 142 may prevent the rising of each of thigh supports 110 and 112 at their back-end corner, thereby causing a rotation angle of each of thigh supports 110 and 112 with respect to the ground. That is, thigh supports 110 and 112 are not only in abduction but also rotated such to be positioned at an angle with respect to the ground, thereby causing the saddle posture. Other means for causing such rotation angle with respect to the ground, may be implemented in system 100.

Figure 5:
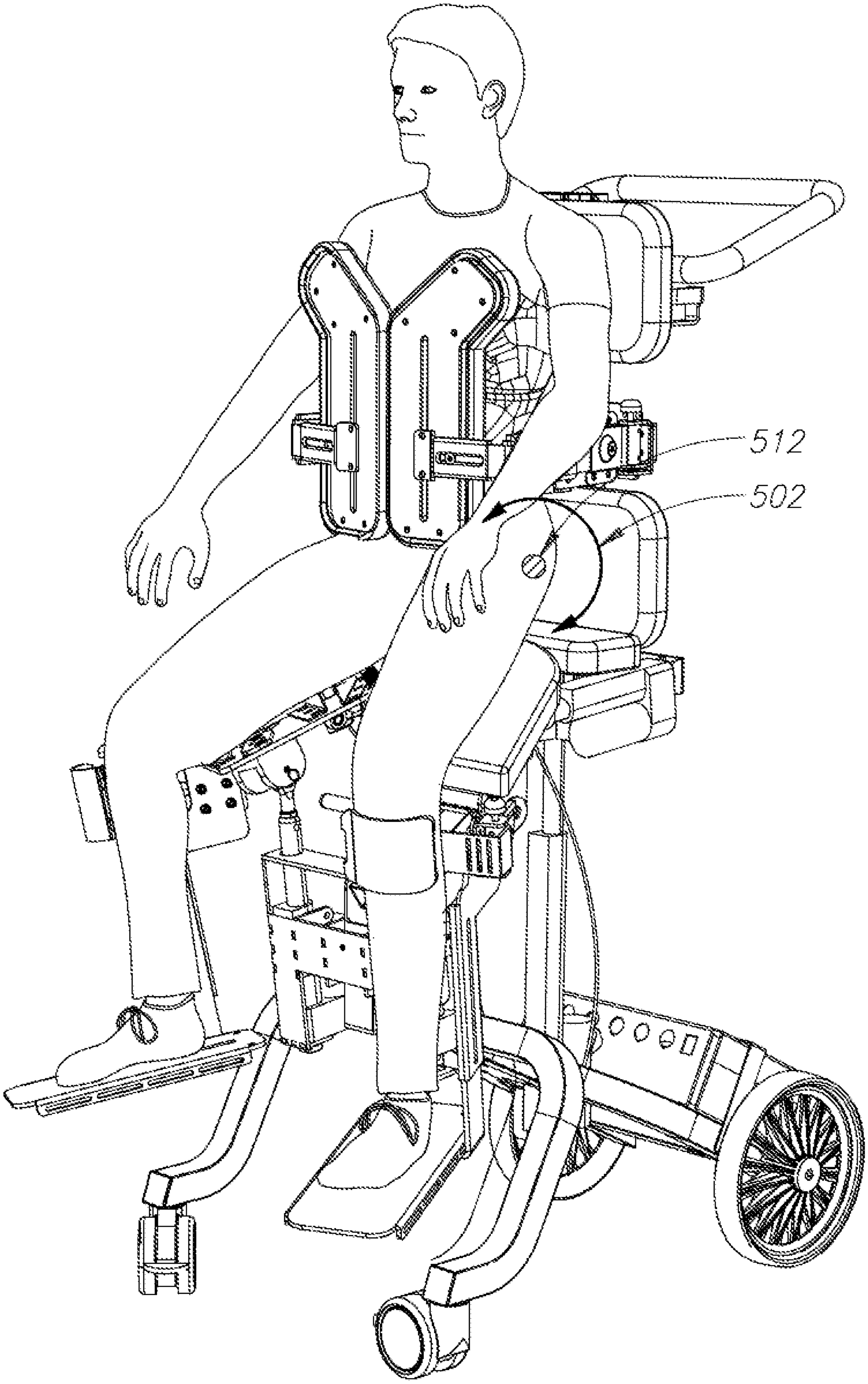
FIG. 5 is a schematic illustration of a perspective view of a system for supporting a user sitting while changing sitting positions of the user, in saddle state, illustrating thigh rotation, according to embodiments of the present disclosure.

Reference is now made to FIG. 5, which is a schematic illustration of a perspective view of a system for supporting a user sitting while changing sitting positions of the user, in saddle state, illustrating thigh rotation, according to embodiments of the present disclosure. According to embodiments of the disclosure, thigh rotation, illustrated by arrow 502, around rotation center or pivot 512, is possible, during saddle position but also as part of other sitting positions of system 100. Each of the thighs supports and thus each of user's thighs may be rotated at substantially full joint capability of about each of the thigh supports two or three-dimensional joints. e.g., thigh joint 126. Rotation of each thigh may be performed independently of the other opposite thigh, or it may be performed simultaneously, either to create a symmetrical motion, e.g., abduction of the thighs moving at same distance from the middle of frame 101, or an asymmetrical motion, e.g., abduction or adduction of the thighs moving at different distances or angles from the middle of frame 101.

Figure 6:
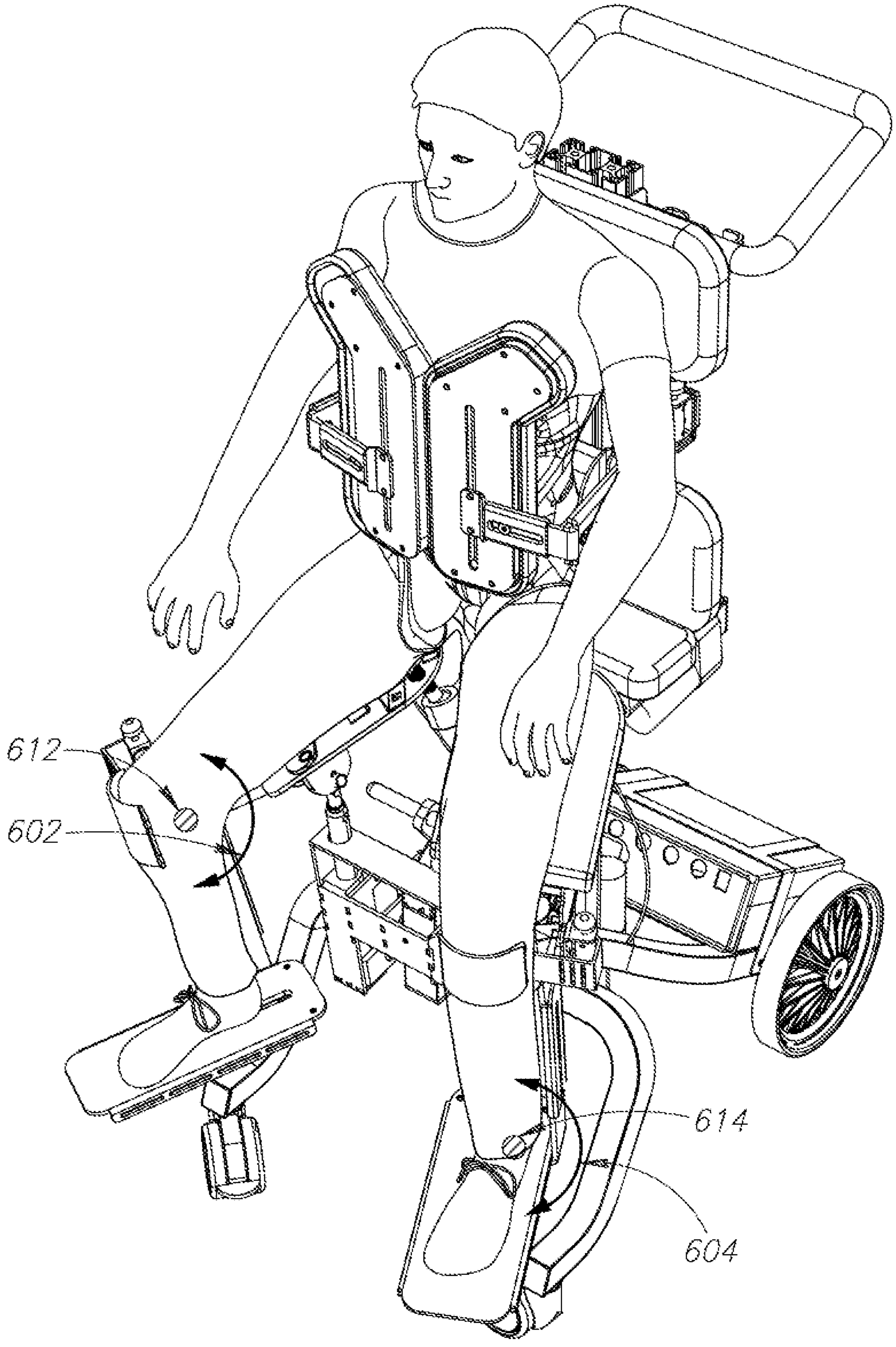
FIG. 6 is a schematic illustration of a perspective view of a system for supporting a user sitting while changing sitting positions of the user, in saddle state, illustrating knee and ankle rotation, according to embodiments of the present disclosure.

Reference is now made to FIG. 6, which is a schematic illustration of a perspective view of a system for supporting a user sitting while changing sitting positions of the user, in saddle state, illustrating knee and ankle movement, according to embodiments of the present disclosure. In some embodiments, as illustrated in FIG. 6, system 100 may enable rotation of the knees of the user, illustrated by arrow 602, around rotation center or pivot 612, which may be enabled by rotation of the hip, via thigh joint 126. That is, once the hip is rotated, the knee is able to move outwards or inwards via the hip rotation. Without rotation of the hip, the knee is merely able to flex or extend Each of the knee supports 114 and 116 may flex or extend about their respective joints, e.g., knee joints 124 and 122, either simultaneously, or independently from one another, as a continuation to the rotation motion possible with respect to the thighs of the user, explained with respect to FIG. 5.

Similarly, system 100 may enable system 100 may enable rotation of the ankles of the user, illustrated by arrow 604, around rotation center or pivot 614, which may be enabled by rotation of the hip, via thigh joint 126. That is, once the hip is rotated, the ankle is able to move outwards or inwards via the hip rotation. Without rotation of the hip, the ankle is merely able to flex or extend. Each of the foot rests 118 and 120 may flex or extend about their respective joints, either simultaneously, or independently from one another, as a continuation to the rotation motion possible with respect to the thighs of the user, explained with respect to FIG. 5.

Figure 7:
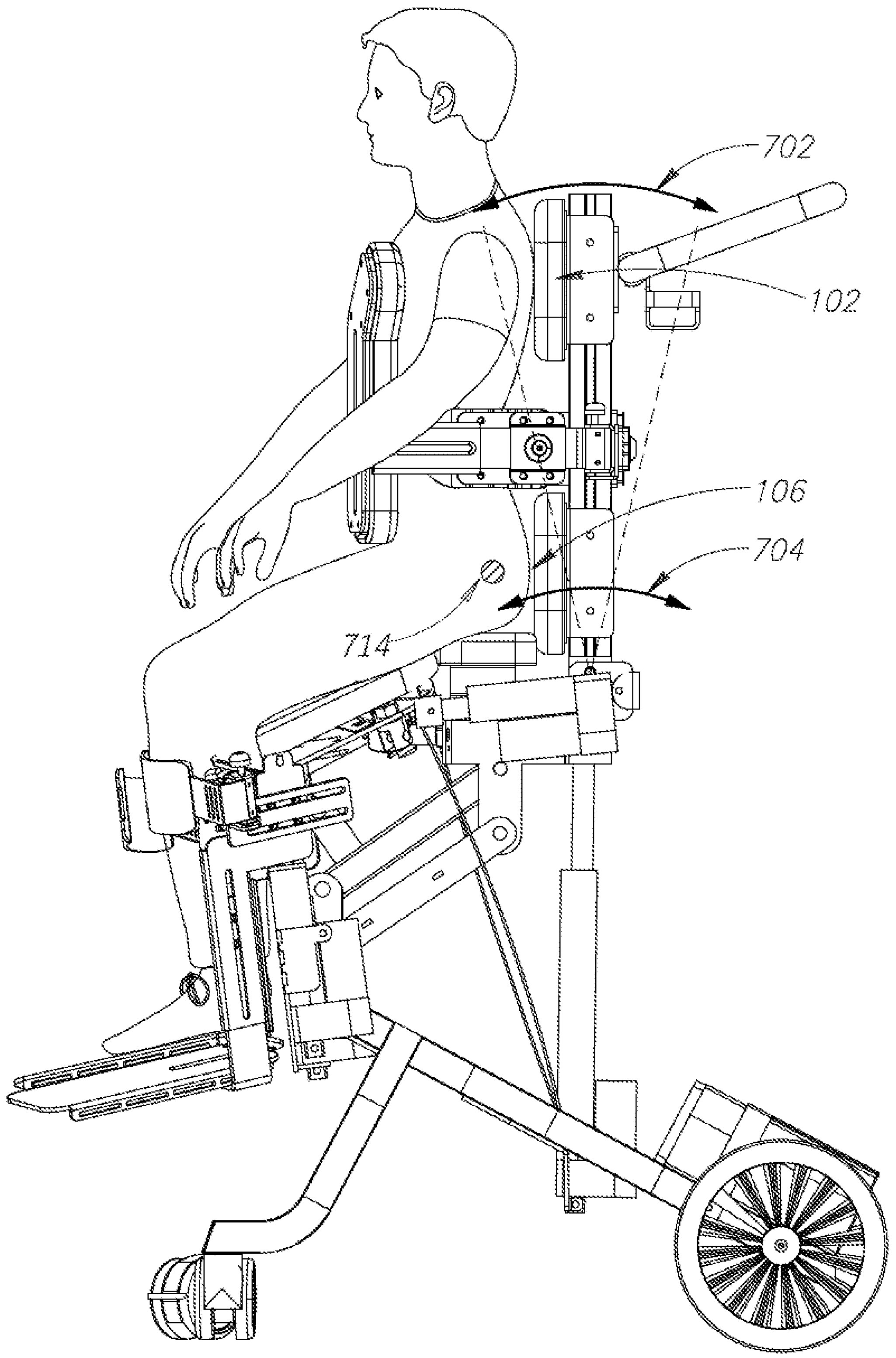
FIG. 7 is a schematic illustration of a side view of a system for supporting a user sitting while changing sitting positions of the user, in saddle state, illustrating back rotation and tilt, according to embodiments of the present disclosure.

Reference is now made to FIG. 7, which is a schematic illustration of a side view of a system for supporting a user sitting while changing sitting positions of the user, in saddle state, illustrating back rotation and recline, according to embodiments of the present disclosure. According to some embodiments, system 100 may enable back recline in addition to back rotation. Back recline, illustrated by arrow 702, may be enabled by system 100 comprising a two-dimensional hinge or joint, which may allow lower back support 106 and upper back support 102 to move forward and backwards. That is, lower back support 106 may comprise a hinge connecting back support 106 to frame 101, which may enable back support 106 to change its reclining angle. Upper back support 102 may move along with lower back support 106 as one single unit, or it may be able to enable an additional rotation angle.

In addition, system 100 may enable lower back support 106 to change its orientation by enabling lower back support to rotate about the middle of frame 101, thus allowing a user sitting in system 100 to rotate to his right side or rotate to his left side of his body, illustrated by arrow 704, around a rotation center or pivot 714. The ability of system 100 to perform such recline and rotation angle positions may enable the user to maintain the length and flexibility of his hip, lower back and upper back muscles, as well as his lateral side muscles.

In some embodiments, system 100 may be able to perform a tilt, meaning that the angle between the back and pelvis of the user is maintained, while both the seat and back support of system 100 are moved backwards (or forward). For example, once controller or control computer 132 receives readings from system 100, e.g., from system sensors and physiological sensors, that the user is under pressure, system 100 via control computer 132 may instruct on a change in posture to perform a tilt in order to ease pressure applied on the user by system 100.

As explained hereinabove with respect to FIG. 1, in case central control computer 132 determines a motion is applying high pressure on the users muscles, the system 100 may change position in order to ease on the user's muscle tension. Thus, if the central control computer 132 collects and analyzes measurements showing the tilt of the lower back support applies too much pressure on the user's back muscles, or if the central control computer 132 determines the rotation angle of the back support 106 is too much to handle by the user, system 100 may automatically decrease or increase the rotation angle and recline of the lower back support 106.

Figure 8:
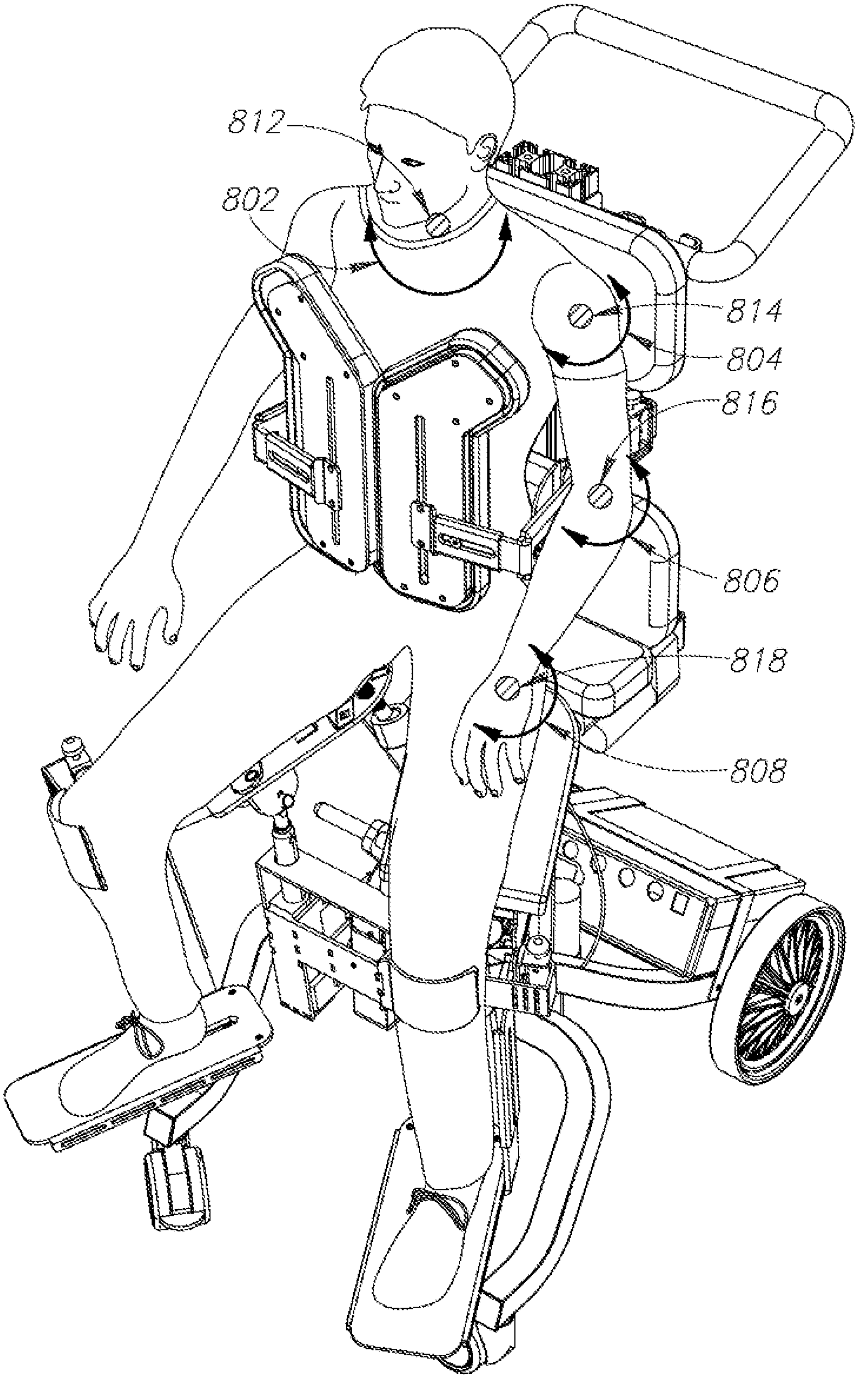
FIG. 8 is a schematic illustration of a perspective view of a system for supporting a user sitting while changing sitting positions of the user, in saddle state, illustrating neck, shoulder, elbow, and hand rotation, according to embodiments of the present disclosure.

Reference is now made to FIG. 8, which is a schematic illustration of a perspective view of a system for supporting a user sitting while changing sitting positions of the user, in saddle state, illustrating neck, shoulder, elbow, and hand rotation, according to embodiments of the present disclosure. As explained hereinabove, each support or rest of the user's different body parts, may rotate in substantially full joint capability. In some embodiments, system 100 may further comprise a head or neck support, a shoulder support, an elbow support and a hand support, or any combination thereof. As such, when system 100 comprises a head or neck support (not shown), that head or neck support may be attached to frame 101 via a joint, e.g., a two or three-dimensional joint (not shown), which may enable the head/neck support to rotate e.g., left and right, around a rotation center or pivot 812 with respect to frame 101, the rotation illustrated by arrow 802.

Similarly, when system 100 comprises a shoulder support (not shown), that may be able to move independently from, for example, upper back support 102. The shoulder support may be attached to frame 101 via a joint, e.g., a two or three-dimensional joint (not shown), which may enable the shoulder support to rotate, e.g., backwards and forwards, around a rotation center or pivot 814, with respect to frame 101, the rotation illustrated by arrow 804.

Similarly, when system 100 comprises an elbow support (not shown), that elbow support may be attached to frame 101 via a joint, e.g., a two or three-dimensional joint (not shown), which may enable the elbow support to rotate, e.g., backwards and forwards or left and right, around a rotation center or pivot 816, with respect to frame 101, the rotation illustrated by arrow 806.

Similarly, when system 100 comprises a hand support (not shown), that hand support may be attached to frame 101 via a joint, e.g., a two or three-dimensional joint (not shown), which may enable the hand support to rotate, e.g., to the left or to the right of the joint, around a rotation center or pivot 818, with respect to frame 101, the rotation illustrated by arrow 808.

Each pair of equivalent body parts, such as hands, elbows, and shoulders, may be moved independently of one another, such that the timing or operation or their respective supports, and degree or amount of movement may be determined independently of one another.

Figure 9:
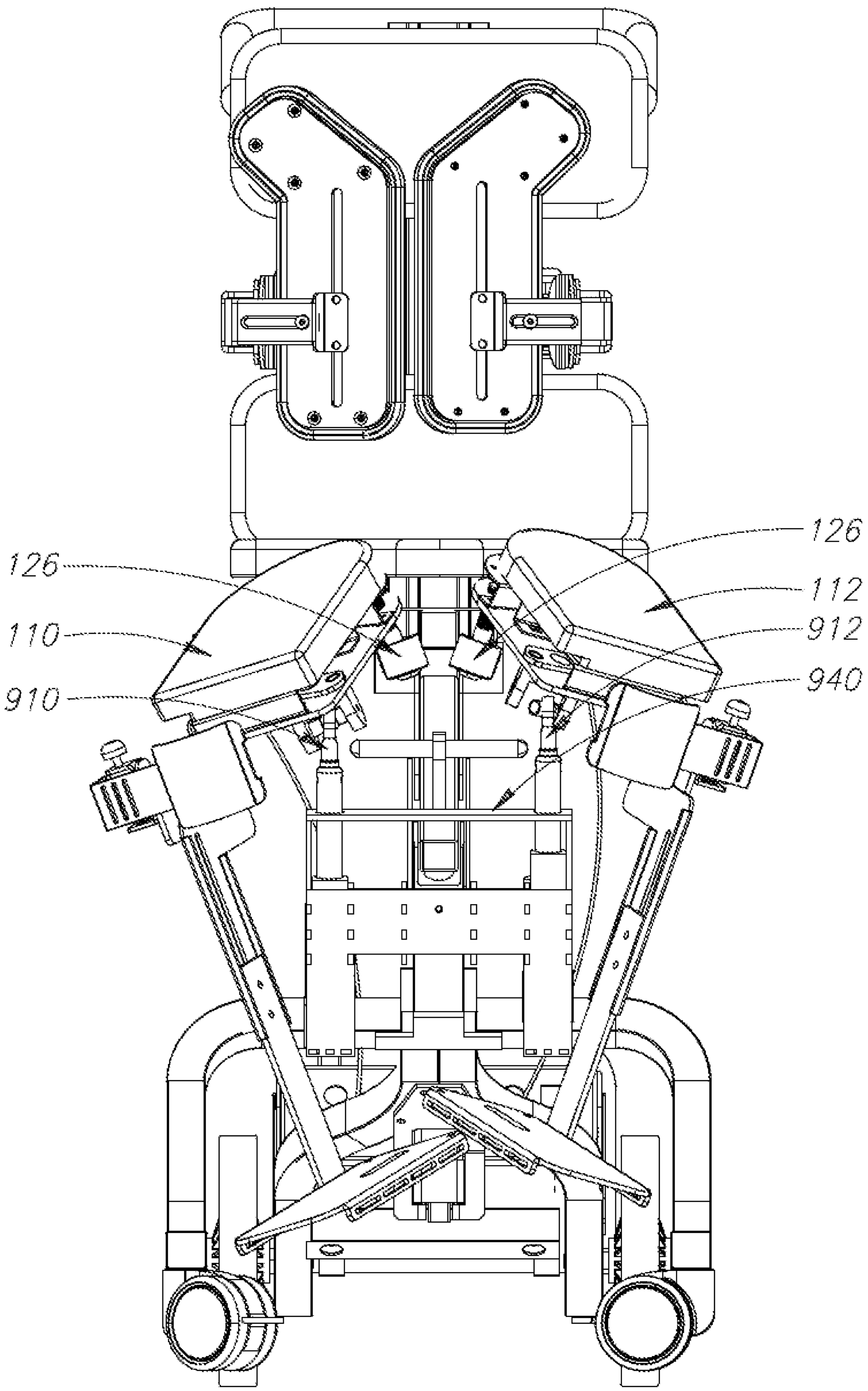
FIG. 9 is a schematic illustration of a front view of a system for supporting a user sitting while changing sitting positions of the user, in saddle state, according to embodiments of the present disclosure.

Reference is now made to FIG. 9, which is a schematic illustration of a front view of a system for supporting a user sitting while changing sitting positions of the user, in saddle state, according to embodiments of the present disclosure.

In some embodiments, system 100 may comprise a joint locking mechanism 940, which may be located at the front side of system 100 and operated by a motor or another known electrical or manual locking mechanism. Joint locking mechanism 940 may be configured to prevent uncontrollable movement of certain components of system 100. Specifically, joint locking mechanism 940 may be configured to prevent the saddle posture from occurring uncontrollably. The presence of joint locking mechanism 940 along the front end of frame 101 causes thigh supports 110 and 112 to align according to joint locking mechanism 940, thereby to prevent hinges 910 and 912, or thigh supports 110 and 112, respectively, from moving beyond the location of motor locking mechanism 940. Once hinges 910 and 912, which connect their respective thigh supports to frame 101, come in contact with joint locking mechanism 940, e.g., when front locking mechanism 940 is lowered, hinges 910 and 912 are forced to be aligned with and lowered towards joint locking mechanism 940, thereby causing alignment of thigh supports 110 and 112 and preventing rotation of thigh supports 110 and 112, which prevents the saddle posture, since saddle posture requires presence of an angle between each thigh support 110 and 112 with respect to the ground. Alignment of the thigh supports 110 and 112 caused by joint locking mechanism 940 does not enable any rotation angle of the thigh supports 110 and 112 as required when changing a posture to the saddle posture.

Figure 10:
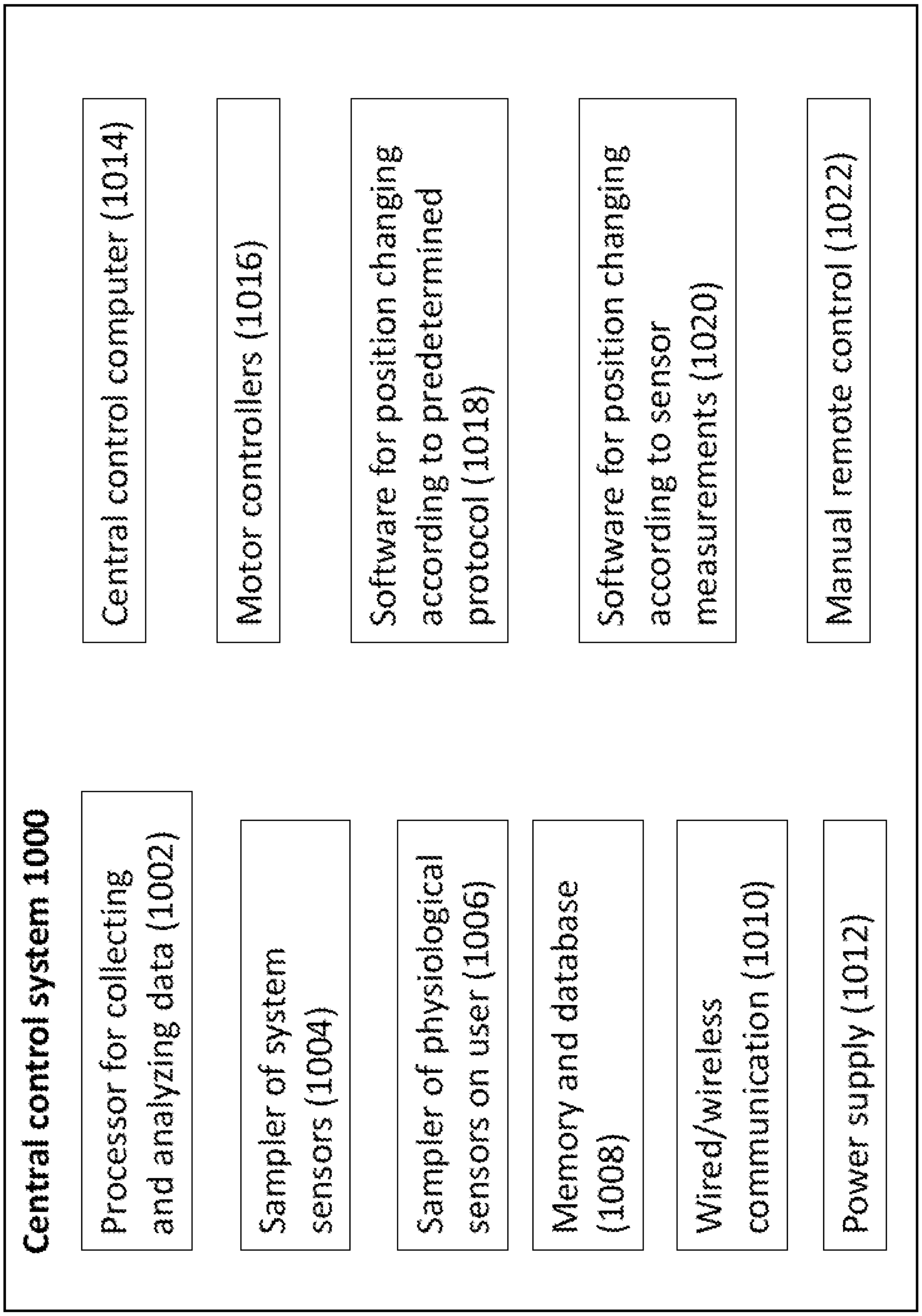
FIG. 10 is a schematic illustration of a central control system of a system for supporting a user sitting while changing sitting positions of the user, according to embodiments of the present disclosure.

Reference is now made to FIG. 10, which is a schematic illustration of a central control system or a controller of a system for supporting a user sitting while changing sitting positions of the user, according to embodiments of the present disclosure. According to some embodiments, system 100 may comprise a controller or central control system 1000. In some embodiments, central control system 1000 may comprise a processor for collecting and analyzing data 1002. Processor 1002 may be configured to collect data measured by pressure, force and resistance sensors of system 100, as well as data measured by physiological sensors, and processor 1002 may further analyze the collected data such to be used later for determining whether a motion protocol should proceed as planned or be changed due to certain measured data.

According to some embodiments, central control system 1000 may comprise a sampler of system sensors 1004, which may sample measurements detected by system sensors. Central control system 1000 may further comprise a sampler of physiological sensors 1006, whereby the physiological sensors may be located on the user's body. Sampler 1006 may sample measurements detected by physiological sensors.

Central control system 1000 may further comprise a memory and database 1008, which may store the data measured by the sensors, as well as data inputted by the user and/or caregiver.

Central control system 1000 may further comprise wired or wireless communication means 1010, which may be configured to communicate the stored data and the analyzed data to system 100 or may communicate feedback created by central control system 1000 to system 100.

Central control system 1000 may further comprise power supply 1012, which may be a rechargeable battery, or may be a power supply that is wired and connected to an electrical outlet.

Central control system 1000 may further comprise a central control computer 1014, which may be equivalent to central control computer 132 (FIG. 1) which may be the unit that controls operation of system 100, i.e., controlling changing positions of system 100 to practically any sitting position.

Central control system 1000 may comprise motor controllers 1016, which may directly control the motors of system 100, thereby controlling movement of the various supports and rests of system 100.

Central control system 1000 may further comprise a software for changing position according to predetermined protocol 1018, i.e., software 1018 may instruct on position changing based on a protocol that is determined prior to operation of system 100 per a session of operation. Central control system 1000 may further comprise a software for changing position according to sensor measurements 1020. That is, in some embodiments, the position changing may be based on a predetermined protocol, whereas in other embodiments, the position changing session may be based on measurements collected by different sensors measurements, be it system measurements of pressure, forces, resistance, or physiological sensors' measurements. In yet other embodiments, a combination of sensor measurements and predetermined protocol may be used, such that the predetermined protocol may be changed based on the collected measurements.

Central control system 1000 may comprise a manual remote control 1022, which may be configured for manually changing the position of the user within system 100. The manual remote control may be in communication with the motors of system 100, thereby enabling control of the motors, which may control movement of the various body parts supports and rests. In some embodiments, controller or central control system 100 may be a computer or microcomputer operated controller or a manually operated controller. A manually operated controller may comprise a manual remote control or may comprise cables and/or strings that may be manually pulled in order to operate system 100.

Figure 11:
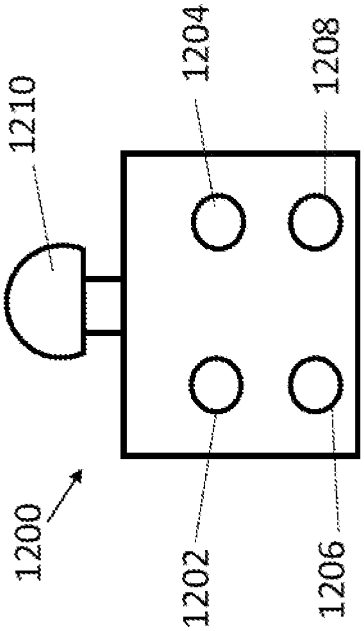
FIG. 11 is a schematic illustration of a remote control for operating a system for supporting a user sitting while changing sitting positions of the user, according to embodiments of the present disclosure.

Reference is now made to FIG. 11, which is a schematic illustration of a remote control for operating a system for supporting a user sitting while changing sitting positions of the user, according to embodiments of the present disclosure. A remote control 1200 for manually operating system 100 may comprise several press buttons, touch icons on a touch screen or joystick buttons for manually operating each and every one of the supports and rests of system 100. In some embodiments, remote control 1200 may comprise an 'open' button 1202, which may be configured to instruct the at least one motor of system 100 to distant a certain support or rest from the middle portion of frame 101, i.e., to move that support or rest away from the middle of frame 101. In some embodiments, remote control 1200 may comprise a 'close' button 1204, which may be configured to instruct the at least one motor of system 100 to bring a certain support or rest towards the middle portion of frame 101, i.e., to move that support or rest towards the middle of frame 101. In other embodiments, a single joystick button may be used to instruct opening and closing of a support or rest. In yet other embodiments, remote control 1200 may comprise a touch screen that may include touch icons per each operation provided by system 100, which when touched would instruct system 100 of the selected operation to occur. In some embodiments, the 'open' command may be equivalent to abduction motion, while the 'close' command may be equivalent to adduction motion. In some embodiments, pressing the 'open' button 1202 or pressing 'close' button 1204 may be a one-time press, which may cause a continuous motion without the need to continuously press each of these buttons, whereas in other embodiments, the motion is continued only as long as each button is pressed.

In some embodiments, remote control 1200 may further comprise a 'lift' button 1206, which may be configured to instruct system 100 to lift seat 108 or any other support or rest of system 100. Remote control 1200 may further comprise 'lower' button 1208, which may be configured to instruct system 100 to lower seat 108 or any other support or rest of system 100. In other embodiments, remote control 1200 may comprise a joystick for operating lifting and lowering operations of the supports and rests of system 100. In some embodiments the same joystick may be used to perform all four operations of lowering, lifting, opening and closing. In some embodiments, in case remote control 1200 comprises a touch screen, then touch icons may be used to provide such instructions to system 100.

In some embodiments, remote control 1200 may comprise a 'stop' button 1210, which may be configured to stop an operation while ongoing, thus the degree or amount of opening, i.e., moving a support or rest away from the middle of frame 101 after the 'open' button 1202 is operated, may be controlled by 'stop' button 1210 as well as by the 'close' button 1204.

In some embodiments, remote control 1200 may be designed such that as long as a button is pressed, operation is ongoing, whereas when the button ceases to be pressed, the operation stops. In other embodiments, pressing each button may be a one-time press, which may cause a continuous motion without the need to continuously press each of the buttons of remote control 1200.

Any combination of buttons, touch icons and joysticks may be implemented as part of remote control 1200.

Figure 12:
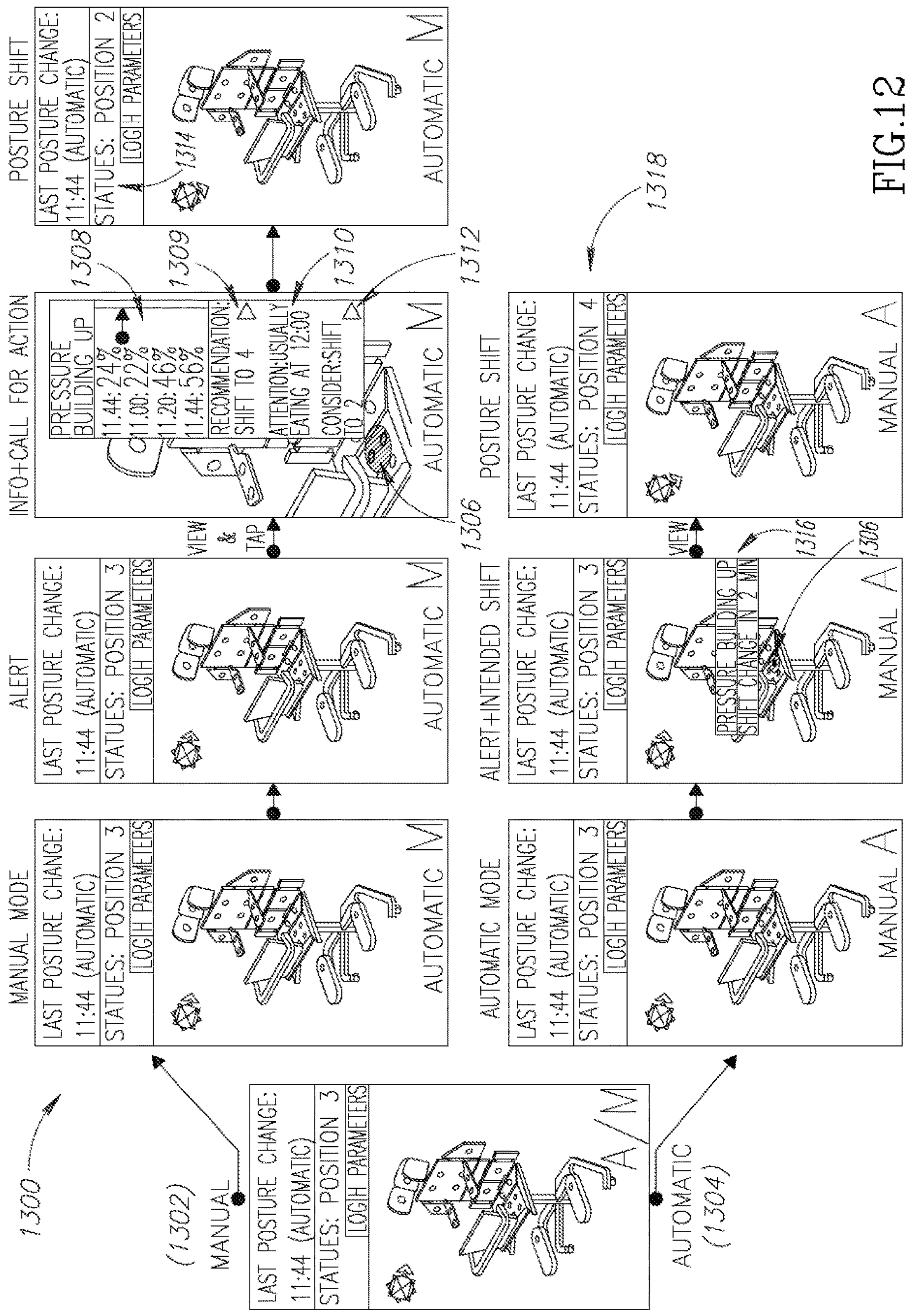
FIG. 12 is a schematic illustration of a GUI of an application for operating a system for supporting a user sitting while changing sitting positions of the user, according to embodiments of the present disclosure.

Reference is now made to FIG. 12, which is a schematic illustration of a GUI of a software application for operating a system for supporting a user sitting while changing sitting positions of the user, according to embodiments of the present disclosure. In some embodiments, system 100 may be operated and controlled via an application, which may be run on a user's computerized device, on a caregiver's computerized device, or on a family member's computerized device. The GUI 1300 of the application may comprise buttons, e.g., touch icons for providing instructions of operating system 100, e.g., moving supports and rest towards the middle of frame 101, moving supports and rests away from the middle of frame 101, lowering or lifting any support or rest of system 100 and stopping any operation that system 100 is currently performing.

According to some embodiments, GUI 1300 may comprise a 'protocol' button which may be used when a user or caregiver wishes to operate system 100 according to a predefined protocol. The protocol is initially selected and inputted via the application, e.g., via GUI 1300, and later on, that predetermined protocol may be selected by the user or by the caregiver. GUI 1300 may be used to manually update or change the protocol by the user or caregiver based on measurements collected by system sensors or physiological sensors, or the protocol may be updated automatically once such measurements are inserted and analyzed by the software application.

In some embodiments, GUI 1300 may comprise a manual mode 1302 and an automatic mode 1304. During the manual mode, the GUI 1302 displayed to the user or caregiver may comprise information with respect to: current posture of system 100, time at which last posture change occurred, locations along system 100 where pressure is building up by system 100 onto the user (e.g., location 1306), percentage of pressure build up along system 100 and percentage of stress of the user, for example, as measured by a pulse sensor located on the user's body 1308, a recommendation to which posture system 100 should be changed to in order to ease the building up pressure or stress 1309, and notification re user's daily schedule 1310, which may affect the recommended change in posture 1312. For example, if the user is typically eating his lunch at 12:00 pm, and the time now is close to the usual 12:00 pm lunch time, GUI 1302 may recommend to change posture, for example, to an upright sitting position instead of a better pressure relieving posture which is not suitable for eating lunch at, e.g., reclining. The system may change the user's position to any position that is found to be most suitable for that user to best function at, according to the operation he wishes to fulfill. Once a change in posture is accomplished, manually. GUI 1302 may display the current posture to the user or caregiver 1314.

In other embodiments. GUI 1304 may comprise an automatic mode 1304, which may display to the user or caregiver the current posture and the recommended change in position 1316, as well as the new changed posture 1318, which may be automatically performed by system 100. Since mode 1304 is an automatic mode, system 100 via controller 132 (FIG. 1) or controller 1000 (FIG. 10) may perform position changes automatically without human intervention, based, for example, on readings from system sensors and/or physiological sensors of system 100. The automatic decisions of system 100 may be made either with simple "old fashioned" software (IF>THEN/ELSE loops) or more up-to-date AI algorithms based on Deep Learning study and neural networks designed for this task, as well as reinforcement deep learning models.

It should be clear that any other information may be displayed via GUI 1300, while informing the user and/or caregiver of status of sitting posture of the user seated within system 100.

Figure 13:
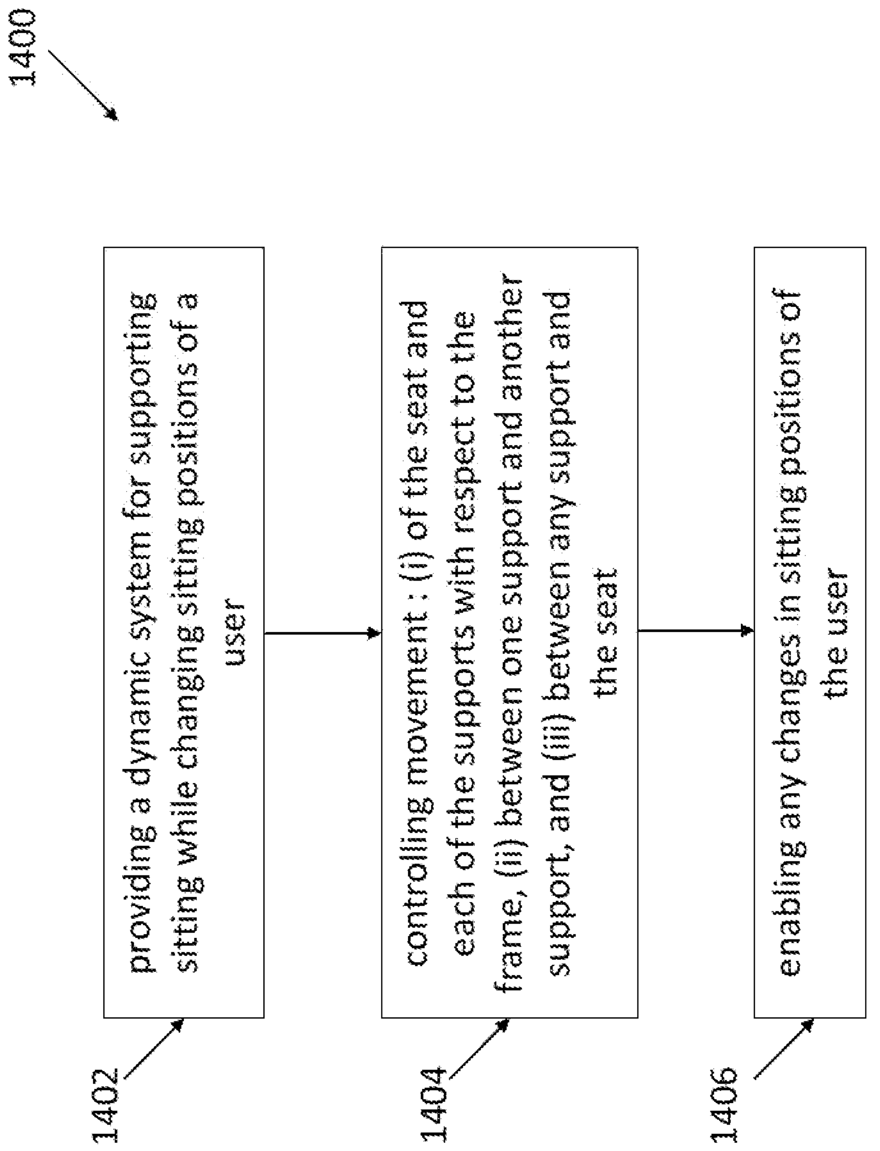
FIG. 13 is a schematic flow chart depicting a method for changing sitting positions of a user, according to embodiments of the disclosure.

Reference is now made to FIG. 13, which is a schematic flow chart depicting a method for changing sitting positions of a user, according to embodiments of the disclosure. According to some embodiments, method 1400 for changing sitting positions of a user may comprise operation 1402, which may comprise providing a dynamic proactive system for supporting sitting while changing sitting positions of a user. The dynamic proactive system provided for supporting sitting may be system 100 (FIG. 1), which may comprise a plurality of supports and rests for supporting specific corresponding body parts, e.g., seat 108, while these supports or rests may be moveable in substantially fill joint capability with respect to the system's frame 101. In some embodiments, method 1400 may further comprise operation 1404, which may comprise controlling movement of the seat, e.g., seat 108, and each of the supports or rests with respect to frame 101, controlling movement between one support and another support, and controlling movement between any support and the seat, e.g., seat 108. That is, controlling operation of system 100 may comprise controlling movement of the various supports and rests of system 100, with respect to one another, and with respect to the frame 101 of system 100.

In some embodiments, method 1400 may further comprise operation 1406, which may comprise enabling any changes in sitting positions of the user. That is, since system 100 may enable movement of a plurality of supports, it may enable a user to change sitting positions and other positions to substantially any position. For example, system 100 may be configured to provide the following positions, as an example: sitting straight, sitting with the back reclined backwards, sitting with the system tilted backwards, sitting with the feet raised while the thighs are bended, sitting with the thighs straightened, sitting with thighs straightened along with feet raised up, lying down, standing, saddle position, and so on, the positions being almost endless, since any support may be slightly changed in its angle and its position with respect to frame 101.

In some embodiments, controlling operation 1404 may comprise controlling two or three-dimensional movement of different body parts of the user. In some embodiments, the two-dimensional movement may comprise flexing or extending joints of lower body part of a user and abducting or adducting joints of lower body part of a user, and the two or three-dimensional movement may comprise rotating joints of lower body part of a user.

In some embodiments, controlling operation 1404 may comprise learning and determining the postures or positions that a user is at, for example, based on data collected by the various sensors of the system, e.g., by measuring pressure applied onto the various supports via corresponding pressure sensors attached onto the supports. For example, a high pressure sensed by a pressure sensor may be translated to a corresponding support which the user is substantially leaning onto, whereas little or no pressure sensed by a pressure sensor may be translated to a corresponding support which the user is less to not leaning onto, thereby the controlling operation may comprise determining current postures of the user. The controlling operation may further comprise learning common or any postures of the user and recommending posture changes accordingly, thereby causing the user to strengthen core muscles and improve length and flexibility of muscles, ligaments and tendons of the user.

In some embodiments, controlling operation 1404 may comprise controlling changes in sitting postures of the user based on a predefined protocol. In some embodiments, the predefined protocol may comprise predefined repeating sequences of different changes in postures of the user.

In some embodiments, controlling operation 1404 may comprise controlling changes in sitting postures of the user in a one-time manual control manner. In some embodiments, controlling operation 1404 may comprise controlling position of each support of the plurality of supports with respect to another support or with respect to the frame according to the physical dimensions of the user.

In some embodiments, the system may comprise system sensors for measuring forces and pressures applied on the user by the system or on the system by the user. In some embodiments, controlling operation 1404 may comprise applying an algorithm for reporting and changing sitting postures of the user based on the forces and pressures measurements by the system sensors.

In some embodiments, the system may comprise physiological sensors for measuring physiological parameters of the user. In some embodiments, controlling operation 1404 may comprise applying an algorithm for reporting and changing sitting postures of the user based on measurements of the physiological sensors.

In some embodiments, the movement of each support of the plurality of supports may be independent from movement of any other support.

In some embodiments, the movement of each of the plurality of supports may occur while another different support rests or moves at a different angle or position.

In some embodiments, the movement of a first support of the plurality of supports may be symmetrical or asymmetrical to movement of a second support of the plurality of supports, the first and second supports being supports of symmetrical body parts.

In some embodiments, method 1400 may further comprise logging data related to the user, analyzing and processing the logged data, and providing feedback to the user or the care giver as to required movement per analysis of the logged data.

In some embodiments, the analyzing operation may comprise comparing the logged data of the user with stored data related to previous position of at least a portion of a body of a user and information related to optimum position of at least a portion of the body of the user, and futher comparing current position data with the stored data. Optionally, the analyzing operation may comprise comparing the logged data of the user with stored data of other users, e.g., other users with similar medical background. That is, big data may be collected, stored and used as basis for various decision making by the system and for general research purposes.

Pilot clinical trial—The following Table 1 includes measurements of a pilot clinical trial that examines the influence of using a dynamic proactive system similar to system 100 on function of upper limb, walking time of 3 meters, balancing abilities during sitting, and head posture. During the pilot clinical trial, a sitting system such as system 100 was used by a male subject at the age of 4, suffering from Cerebral Palsy (CP). The subject's motoric function was determined as GMFCS (Gross Motor Functional Classification Scale) 4, whereby GMFCS ranges along a scale between '1' to '5', '1' being the highest gross motoric function level, and '5' being the lowest gross motoric function. The treatment protocol extended for a period of two and a half months. Measurements have been taken during four time periods:

T1—beginning of trial;

T2—following a month during which the subject was seated in the system twice a day;

T3—following a month during which the subject was seated in the system for non-continuous two weeks, and T4—following 10 days during which the subject did not use the system.

The subject was tested under several standard tests:

(1) "Timed up & go"—subject had to stand up, walk with a walker for three meters and sit back in the sitting system. The time it took the subject to accomplish this test was measured per each session. This test examines the subject's ability to control his back and body core while measuring walking speed.

(2) "Functional reach test in sitting"—the subject was tested for how far he can extend his hands away from his body. This test illustrates the subject's ability to control back and core muscles while measuring his balance during sitting.

(3) "HeadPod sensor"—the subject was monitored per head movements.

(4) "Modified Ashworth scale"—this is a subjective score for measuring muscle tone. Although subjective, experienced caregivers are well trained in using such score. The lower the score, the better it is.

As clearly shown in Table 1, all measured parameters showed improvement along the pilot trial. The walking time shortened in the "Timed up & go" test, the reaching distance the subject was able to accomplish got larger in the "Functional reach test in sitting", the muscle tone was lower and an improvement in head sustaining, and improvement in head movements along front-to-back plane (e.g., head bending movements forwards and backwards) was determined by the "HeadPod sensor" test mainly following a month of use in the dynamic proactive robotic system of the present disclosure.

Protocol—the subject was seated in the robotic system twice a day, for a month, in the morning and at noon, at different times, as mentioned in Table 1.

Each sitting period was divided into two states:

State A—10 ABDUCTION movements of the hips up to 20 degrees (on each side from an adduction posture) each followed by ADDUCTION.

State B—ABDUCTION movement and going into sitting positions at three different reclining angles (Seat Slope) changing gradually each time the subject was seated in the robotic system. The reclining angles were 15 degrees, 30 degrees and 50 degrees.

Sitting time was gradually changing from 5 minutes in every state for the first day (a total of 15 minutes and 9 minutes in every state for the fifth day (a total of 27 minutes).

TABLE 1

| Day of the week/ | 08:30 | | 11:45 | | | | Sitting period |
|---|---|---|---|---|---|---|---|
| treatment time | State | B State degees | State | B State angle | Status | B State angle | in state B (minutes) |
| Sunday | ABA | Abd 20° SS 15° | ABA | Abd 20° SS 30° | ABA | Abd 20° SS 50° | 5 |
| Monday | ABA | Abd 20° SS 15° | ABA | Abd 20° SS 30° | ABA | Abd 20° SS 50° | 6 |
| Tuesday | ABA | Abd 20° SS 15° | ABA | Abd 20° SS 30° | ABA | Abd 20° SS 50° | 7 |
| Wednesday | ABA | Abd 20° SS 15° | ABA | Abd 20° SS 30° | ABA | Abd 20° SS 50° | 8 |
| Thursday | ABA | Abd 20° SS 15° | ABA | Abd 20° SS 30° | ABA | Abd 20° SS 50° | 9 |

Abd—abduction;
SS—Seat Slope

Pilot Clinical Trial Results:

In the Timed up & go test, an improvement was measured in the walking time from the first measurement to the last one, however, the significant improvement took place after the first month of using the robotic system.

In the Functional reach test, there has been an improvement in the distance the subject was able to extend his hand towards an object in forward direction and side directions, mainly following the first month of the trial.

In the Modified Ashworth scale, there was an improvement in the results concerning the upper limbs (shoulders, elbows and wrist) mainly between parameters measured after a month, after that the improvement in muscle tone was maintained throughout the entire trial. In the lower limbs (thighs, knees, ankles) there was an improvement in muscle tone only after use of the system for one month.

In the HeadPod sensor, an improvement was observed with respect to the subject's ability to maintain his head posture in the center at a front-to-back plane (bending head forwards and backwards), i.e., sagittal plane.

The effectiveness observed from using the dynamic proactive system of the present disclosure:

- positive effect in damaged joints on daily functions and hands function, and positive effect on muscle tone with children suffering from CP;
- positive effect on walking quality of children with CP;
- improvement in bio-mechanic and motoric posture in the CP suffering population, improvement in posture control and movement control, during sitting and standing;
- increase in satisfaction of parents and kindergarten teacher from the children's functioning at home and at the kindergarten, and increased satisfaction of the children themselves following use of the dynamic proactive system for changing sitting postures.

While this disclosure has been particularly shown and described with references to example embodiments thereof, it will be understood by those skilled in the art that various changes in form and details may be made therein without departing from the scope of the disclosure encompassed by the appended claims.

What is claimed is:

1. A dynamic proactive system for supporting sitting while detecting and automatically changing sitting postures of a user, said system comprising:

a frame;

a plurality of supports, each of the plurality of supports is configured to support and move a different body part of the user;

a plurality of joints each configured to move independently of or together with any other of the plurality of joints, wherein each of the plurality of supports is connected to the frame via a corresponding joint or multiple joints of the plurality of joints, wherein at least one of the plurality of joints is a two dimensional or a three dimensional joint such to enable a change in angle between the frame and a support corresponding to the two or three dimensional joint;

at least one motor connected to said plurality of supports for moving said plurality of supports;

system sensors for measuring forces and pressures applied on the user by the plurality of supports;

physiological sensors for measuring physiological parameters of the user; and a controller for controlling operation of said at least one motor, thereby to control movement of each of said plurality of supports with respect to said frame or with respect to another support of said plurality of supports, to enable any change in sitting postures of the user and to mimic natural human movement;

wherein said controller receives the measurements measured by the system sensors and the physiological sensors;

further wherein said controller automatically changes position of the plurality of supports, based on the received measurements.

2. The dynamic proactive system for supporting sitting while changing sitting postures of a user according to claim 1, wherein said system is configured to enable two or three-dimensional movement of different body parts of the user.

3. The dynamic proactive system for supporting sitting while changing sitting postures of a user according to claim 1, wherein each of the plurality of joints is configured to perform a three-dimensional rotation motion equivalent to a human full joint capability of rotation, via a two or three-dimensional movement of a corresponding body support of said plurality of supports that supports each of the plurality of joints, thereby enabling a two or three-dimensional movement of a body part that is supported by a respective support of said plurality of supports.

4. The dynamic proactive system for supporting sitting while changing sitting postures of a user according to claim 1, wherein said plurality of supports are selected from a group consisting of: back support, lower back support, upper back support, thigh support, foot rest, knee support, chest support, seat, elbow support, hand support, shoulder support, neck support, or any combination thereof.

5. The dynamic proactive system for supporting sitting while changing sitting postures of a user according to claim 1, said system configured to change posture of the user to a saddle posture.

6. The dynamic proactive system for supporting sitting while changing sitting postures of a user according to claim 1, wherein said system comprises chest supports providing solid support from chest to pelvis of the user to enable upright sitting within the system thereby avoiding movement of the upper body part while enabling movement of the lower body part, further wherein said chest supports are configured to be adjusted per physical parameters of each user with respect to height and width of the chest supports, said system further comprising elongated thigh supports configured to support each thigh and pelvis of the use.

7. The dynamic proactive system for supporting sitting while changing sitting postures of a user according to claim 1, wherein said controller controls changes in sitting postures of the user based on a predefined protocol comprising predefined repeating sequences of different changes in postures of the user, wherein the predefined protocol is updated automatically by the controller based on the received measurements.

8. The dynamic proactive system for supporting sitting while changing sitting postures of a user according to claim 1, wherein said system is used for maintaining length and flexibility of muscles, ligaments and tendons of the user and flexibility of joints of the user.

9. The dynamic proactive system for supporting sitting while changing sitting postures of a user according to claim 1, wherein said system is configured to change sitting postures of the user in a two-dimensional movement or in a two or three-dimensional movement, said two-dimensional movement comprises flexing or extending joints of lower body part of a user and abducting or adducting joints of lower body part of a user, and said two or three-dimensional movement comprises rotating joints of lower body part of a user.

10. The dynamic proactive system for supporting sitting while changing sitting postures of a user according to claim 1, wherein the movement of each support of the plurality of supports is independent from movement of any other support of the plurality of supports.

11. The dynamic proactive system for supporting sitting while changing sitting postures of a user according to claim 1, wherein movement of a first support of the plurality of supports is symmetrical or asymmetrical to movement of a second support of the plurality of supports, said first and second supports being supports of symmetrical body parts.

12. The dynamic proactive system for supporting sitting while changing sitting postures of a user according to claim 1, wherein said system is incorporated into an office chair, a vehicle seat or any other sitting system.

13. The dynamic proactive system for supporting sitting while changing sitting postures of a user according to claim 1, said system sensors comprising body contact pressure sensors, force sensors, angle sensors, accelerometer sensors or any combination thereof.

14. A method for changing sitting postures of a user, said method comprising:

providing a dynamic proactive system for supporting sitting while changing sitting postures of a user, said system comprising:

a frame;

a plurality of supports, each of the plurality of supports configured to support a different body part of the user;

a plurality of joints each configured to move independently of or together with any other of the plurality of joints, wherein each of the plurality of supports is connected to the frame via a corresponding joint of the plurality of joints, wherein at least one of the plurality of joints is a two or three-dimensional joint such to enable a change in angle between the frame and a support corresponding to the two or three-dimensional joint;

at least one motor connected to said plurality of supports for moving said plurality of supports;

system sensors for measuring forces and pressures applied on the user by the plurality of supports;

physiological sensors for measuring physiological parameters of the user; and a controller configured to control operation of said at least one motor;

receiving, by said controller, measurements measured by the system sensors and the physiological sensors; and controlling, by said controller, movement of each of said plurality of supports with respect to said frame, and movement between one support and another support of said plurality of supports, to enable any changes in sitting postures of the user and to mimic natural human movement;

wherein said controlling comprises automatically changing position of the plurality of supports based on the received measurements.

15. The method of claim 14, wherein said controlling comprises controlling two or three-dimensional movement of different body parts of the user.

16. The method of claim 15, wherein said two-dimensional movement comprises flexing or extending joints of lower body part of a user and abducting or adducting joints of lower body part of a user, and said two or three-dimensional movement comprises rotating joints of lower body part of a user.

17. The method of claim 14, wherein said controlling comprises controlling changes in sitting postures of the user based on a predefined protocol comprising predefined repeating sequences of different changes in postures of the user, wherein the predefined protocol is updated automatically by the controller based on the received measurements.

18. The method of claim 14, wherein said controlling comprises controlling position of each support of the plurality of supports with respect to another support or with respect to the frame according to the physical dimensions of the user.

19. The method of claim 14, wherein movement of a first support of the plurality of supports is symmetrical or asymmetrical to movement of a second support of the plurality of supports, said first and second supports being supports of symmetrical body parts.

20. The method of claim 14, further comprising logging data related to the user, analyzing and processing the logged data, and providing feedback to the user or the care giver as to required movement per analysis of the logged data; wherein said analyzing comprises comparing the logged data of the user with stored data related to previous position of at least a portion of a body of a user and information related to optimum position of at least a portion of the body of the user, and further comparing current position data with the stored data.

* * * * *